US012791196B2

(12) United States Patent
Rocca et al.

(10) Patent No.: US 12,791,196 B2
(45) Date of Patent: Nov. 10, 2026

(54) STEAM RELEASE MECHANISM FOR AN OVEN

(71) Applicant: Breville Pty Limited, Alexandria (AU)

(72) Inventors: Damian Philip Rocca, Alexandria (AU); Olexandr Mal'chykov, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 362 days.

(21) Appl. No.: 18/572,882

(22) PCT Filed: Jun. 10, 2022

(86) PCT No.: PCT/AU2022/050572
§ 371 (c)(1),
(2) Date: Dec. 21, 2023

(87) PCT Pub. No.: WO2023/272336
PCT Pub. Date: Jan. 5, 2023

(65) Prior Publication Data
US 2024/0295327 A1 Sep. 5, 2024

(30) Foreign Application Priority Data
Jun. 30, 2021 (AU) ................................ 2021901998

(51) Int. Cl.
*F24C 15/20* (2006.01)
*A47J 36/32* (2006.01)
(Continued)

(52) U.S. Cl.
CPC ........... *F24C 15/2007* (2013.01); *A47J 36/32* (2013.01); *A47J 36/38* (2013.01); *E05F 5/02* (2013.01);
(Continued)

(58) Field of Classification Search
CPC .............. F24C 15/2007; F24C 15/2042; F24C 15/2078; A47J 36/32; A47J 36/38;
(Continued)

(56) References Cited

U.S. PATENT DOCUMENTS 9,897,327 B2 * 2/2018 Phillips .................. F24C 15/04
10,495,317 B1 * 12/2019 Hancock ............ A47J 37/0713
(Continued)

FOREIGN PATENT DOCUMENTS

DE 3931483 A1 4/1991
DE 102016121834 A1 * 5/2018 .......... F24C 15/2007
(Continued)

OTHER PUBLICATIONS

DE102017115590 English Translation (Year: 2019).*
(Continued)

*Primary Examiner* — Jesse S Bogue
(74) *Attorney, Agent, or Firm* — KDW FIRM PLLC

(57) ABSTRACT

There is disclosed herein an oven (10) for cooking food, the oven (10) comprising: a cavity (12) for receiving the food to be cooked; a door (16) that opens to allow food to be placed in the cavity (12), and closed to enclose an interior space
(Continued)

defined by the cavity (12); and a vent actuator (11) configured to selectively open and close a vent opening (36), such that a fluid path extends from the interior space to atmosphere when the vent opening (36) is open.

15 Claims, 31 Drawing Sheets

(51) Int. Cl.
*A47J 36/38* (2006.01)
*E05F 5/02* (2006.01)
*E05F 15/616* (2015.01)
*E05F 15/79* (2015.01)

(52) U.S. Cl.
CPC ............ *E05F 15/616* (2015.01); *E05F 15/79* (2015.01); *E05Y 2201/474* (2013.01); *E05Y 2201/626* (2013.01); *E05Y 2900/308* (2013.01)

(58) Field of Classification Search
CPC ........... E05F 5/02; E05F 15/616; E05F 15/79; E05Y 2201/474; E05Y 2201/626; E05Y 2900/308
See application file for complete search history.

(56) References Cited

U.S. PATENT DOCUMENTS

| | | | | |
|---|---|---|---|---|
| 11,940,153 | B2 * | 3/2024 | Baker | A47J 36/32 |
| 2008/0148960 | A1 * | 6/2008 | Berger | F24C 15/022 126/192 |
| 2018/0094820 | A1 * | 4/2018 | Verdoliva | F24C 15/025 |
| 2019/0110630 | A1 * | 4/2019 | Kitabayashi | A47J 36/321 |
| 2020/0182484 | A1 | 6/2020 | Cowan et al. | |

FOREIGN PATENT DOCUMENTS

| | | | | |
|---|---|---|---|---|
| DE | 102017103392 A1 | | 8/2018 | |
| DE | 102017115590 A1 | | 1/2019 | |
| EP | 1714083 B1 | | 3/2011 | |
| EP | 2713109 A1 | | 4/2014 | |
| WO | WO-2005078352 A1 | * | 8/2005 | F24C 15/022 |

OTHER PUBLICATIONS

Extended European Search Report for EP Application No. 22831055.3, dated Mar. 31, 2025, 8 pages.
International Search Report and Written Opinion dated Sep. 21, 2022, for PCT/AU2022/050572 (12 pages).

* cited by examiner

Closed door position

Open door position

Illustration of air pathway

STEAM RELEASE MECHANISM FOR AN OVEN

FIELD

The present invention relates to ovens for cooking food within a heated cavity.

BACKGROUND

Cooking food in an oven is widely known and used in domestic and commercial settings. Heat is applied to food placed within an enclosed cavity for the required cooking time. However, heat applied to particular food can create excessive humidity within the cavity which can be detrimental to the resulting cooked food. High humidity levels during high temperature cooking can cause surface temperatures of the food to be held below the temperature at which the Maillard reaction occurs. The Maillard reaction is the term used to describe the complex and simultaneous reactions between the polymers and sugars during the cooking process, which typically results in the "browning" of the surface of the food. If the excessive humidity within the oven cavity is keeping the surface of the food below the Maillard reaction temperature, it may prevent the surface becoming crispy.

Humidity within the oven cavity can also create a blast of steam towards the user when the oven door is opened at the end of the cooking process. This has inherent safety risks.

High humidity within the oven can also over cook particular foods if they are left in the oven after the cooking time even though the heat source has been deactivated. In this case, the humidity is also likely to leave the food soggy.

Ovens can also pose a fire risk with the potential of fire escaping from the oven cavity. This is often the result of openings between the cooking cavity and the external structural parts of the oven. Relatively large openings in the oven cavity wall will vent steam during the cooking process but also provide any fire and flame risk access to the oven externals. Even small openings in the oven cavity wall are problematic as they allow for the ingress of air to fuel the fire within. Typically, these openings or gaps occur through the dimensional inaccuracies or tolerances of the various components making up the oven cavity. The tolerances and discrepancies are inherent to many oven cavity constructions due to the discrepancies associated with the manufacturing process.

SUMMARY

It is an object of the present invention to substantially overcome, or at least ameliorate, one or more of the disadvantages of existing arrangements.

There is disclosed herein an oven for cooking food, the oven comprising:

- a cavity for receiving the food to be cooked;
- a door that opens to allow food to be placed in the cavity, and closed to enclose an interior space defined by the cavity; and
- a vent actuator configured to selectively open and close a vent opening, such that a fluid path extends from the interior space to atmosphere when the vent opening is open.

Preferably, the oven further comprises a processor for operative control of the vent actuator to open or close the vent opening at a predetermined time during and/or after the cooking of the food.

Preferably, the vent actuator is configured to move the door to provide the vent opening.

Preferably, the vent actuator includes a push rod configured to extend to push the door open to a vent open position to provide the vent opening.

Preferably, the door has a closing bias when in the vent open position, and the push rod is configured to retract in response to the processor to allow the door to close.

Preferably, the push rod is configured to partially retract in response to the processor to allow the door to move to an intermediate position between the vent open position and closed position.

Preferably, the vent actuator includes a resilient element allowing the push rod to retract in response to an external force acting on the push rod when extended.

Preferably, the resilient element is a coil spring.

Preferably, the vent actuator includes a movable arm to extend the push rod, and the resilient element is a compressible portion of the arm.

Preferably, the vent opening is formed in the cavity and the vent actuator includes a vent flap configured to selectively open and close the vent opening.

Preferably, the vent flap is within the cavity and configured for movement in response to the processor.

Preferably, the vent actuator has a movable abutment surface that is external to the cavity and the vent flap is connected to a tilt lever that is external to the cavity.

Preferably, the vent flap is biased to close the vent opening.

Preferably, the vent actuator includes a motor and at least one limit switch for selectively opening the vent opening.

Preferably, the oven further comprises a user interface to receive inputs related to at least one of:

- Food type;
- Food weight;
- Cooking process; and
- Selected cooked food characteristics.

Preferably, the cooking process selection available via the user interface includes at least one of:

- Toasting;
- Broiling;
- Baking;
- Roasting;
- Dehydrating;
- Pizza;
- Airfrying; and
- Slow cooking.

Preferably, the oven is configured to cook the food for a predetermined cooking time and the vent actuator configured to open the vent opening after the predetermined cooking time to release steam.

There is also disclosed herein is a cooking cavity for use in an oven with a front door that opens to allow food to be placed in the cavity, and closed to enclose an interior space defined by the cavity, the cavity comprising:

- a first component and a second component configured to be joined to define the interior space with a front opening which during use, is covered by the front door in the closed position; and,
- a pelmet structure within the interior space extending along a top portion of the cavity, the pelmet structure providing a tortuous fluid path between the interior space and an exterior side of the front opening.

Preferably, the first component has two generally planar panels forming an L-shape, and the second component has three generally planar panels forming a U-shape such that when the first and second components are joined, the cavity has a generally planar top wall, a bottom wall, a left sidewall, a right sidewall and a rear wall.

Preferably, the two panels of the first component form the top wall and the rear wall, and the three panels of the second component form the left sidewall, the right sidewall and the bottom wall.

Preferably, the first component and the second component have complementary shaped peripheral edge sections that are mechanically sealed together to form the cavity.

Preferably, the mechanical seal is fluid tight. In a further preferred form, the mechanical seal is formed along five straight peripheral edge sections of the first component and the second component respectively.

Preferably, the pelmet structure is adjacent the top wall proximate the front opening.

There is also disclosed herein a method of constructing a cooking cavity for an oven, the oven having a front door that opens to allow food to be placed in the cavity, and closed to enclose an interior space defined by the cavity, the method comprising:

- forming a first component and a second component into shapes such that are able to be joined to define the interior space with a front opening which during use, is covered by the front door in the closed position; and,
- providing a pelmet structure within the interior space extending along a top portion of the cavity, the pelmet structure providing a tortuous fluid path between the interior space and an exterior side of the front opening.

Preferably, the first component is formed as two generally planar panels in an L-shape, and the second component is formed as three generally planar panels in a U-shape such that when the first and second components are joined, the cavity has a generally planar top wall, a bottom wall, a left sidewall, a right sidewall and a rear wall.

Preferably, the first component is joined with the second component such that the two panels of the first component form the top wall and the rear wall, and the three panels of the second component form the left sidewall, the right sidewall and the bottom wall.

Preferably, the first component and the second component are formed to have complementary shaped peripheral edge sections that are mechanically sealed together to form the cavity.

Preferably, the mechanical seal is formed to be fluid tight.

Preferably, the mechanical seal is formed along four straight peripheral edge sections of the first component and the second component respectively.

Preferably, the method of constructing a cooking cavity further comprises positioning the pelmet structure adjacent the top wall proximate the front opening.

BRIEF DESCRIPTION OF THE DRAWINGS

Preferred embodiments of the present invention will now be described, by way of example only, with reference to the accompanying drawings in which.

DETAILED DESCRIPTION

Figure 27:
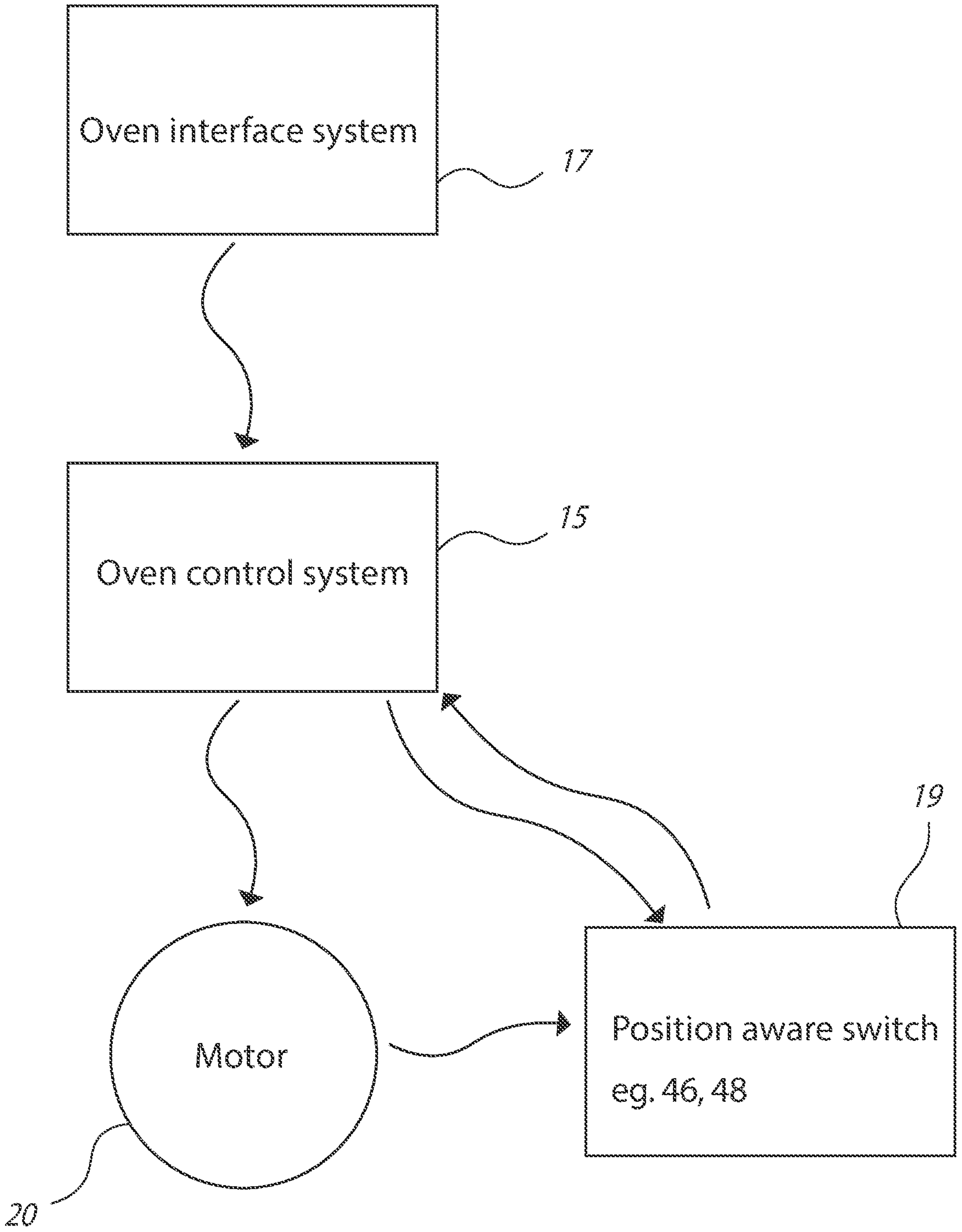
FIG. 27 is a system diagram relating to the operation of the oven.
Figure 28:
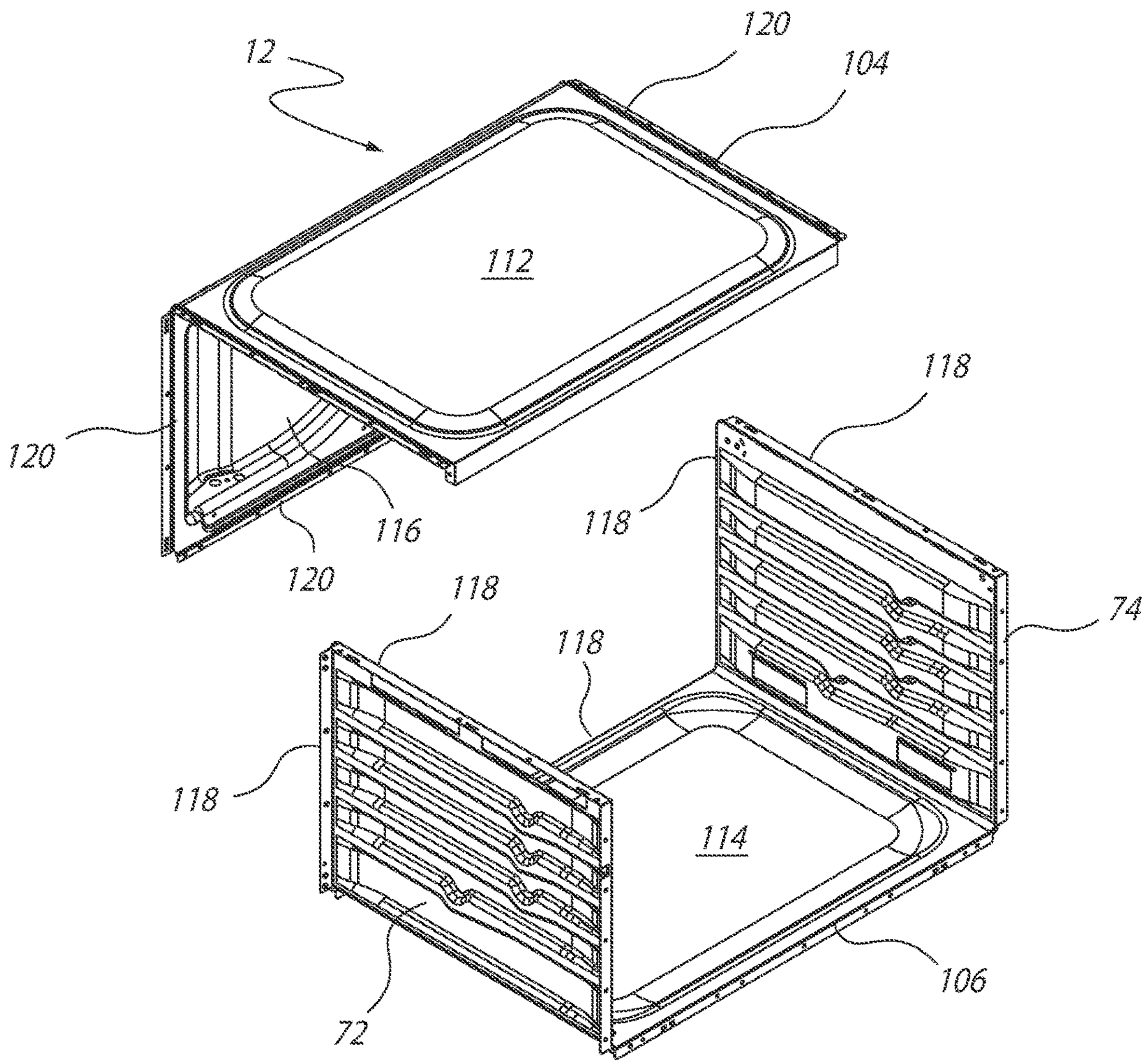
FIG. 28 shows two of the major components of the oven cavity in an exploded perspective view.

A first embodiment of the oven 10 is shown in FIGS. 1 to 7. The oven 10 is shown without any external casing or panels to reveal the cooking cavity 12 supported on a base 14. The cooking cavity 12 has a door 16 hinged to the front for user access to the cavity interior. The oven 10 has a means of generating heat 18 such as an electric heating element (not shown) to cook the food within. The cooking process is controlled by a control processor 15 in accordance with inputs from a user interface 17 and feedback sensors 19 (schematically depicted in FIG. 27).

A vent actuator 11 includes a motor 20 at the rear left-hand lower corner of the oven 10 coupled to the bottom of a vertical shaft 22. Workers in this field will appreciate the motor and linkages could be on either side of the oven, or indeed on both sides of the oven. In the example shown in FIGS. 1, 2 and 3, the vertical shaft 22 extends to a linkage 24 at the top rear left corner. The linkage 24 connects the vertical shaft 22 to a horizonal shaft 26 such that rotation of the vertical shaft 22, rotates the linkage 24 which in turn provides axial movement of the horizontal shaft 26. In this way, at least partial rotations of the linkage 24 provide reciprocating axial movement of the horizontal shaft 26. Skilled workers will understand some forms of the oven have a linkage that fully rotates, and rotation in either direction, or both directions are also options.

Figure 4:
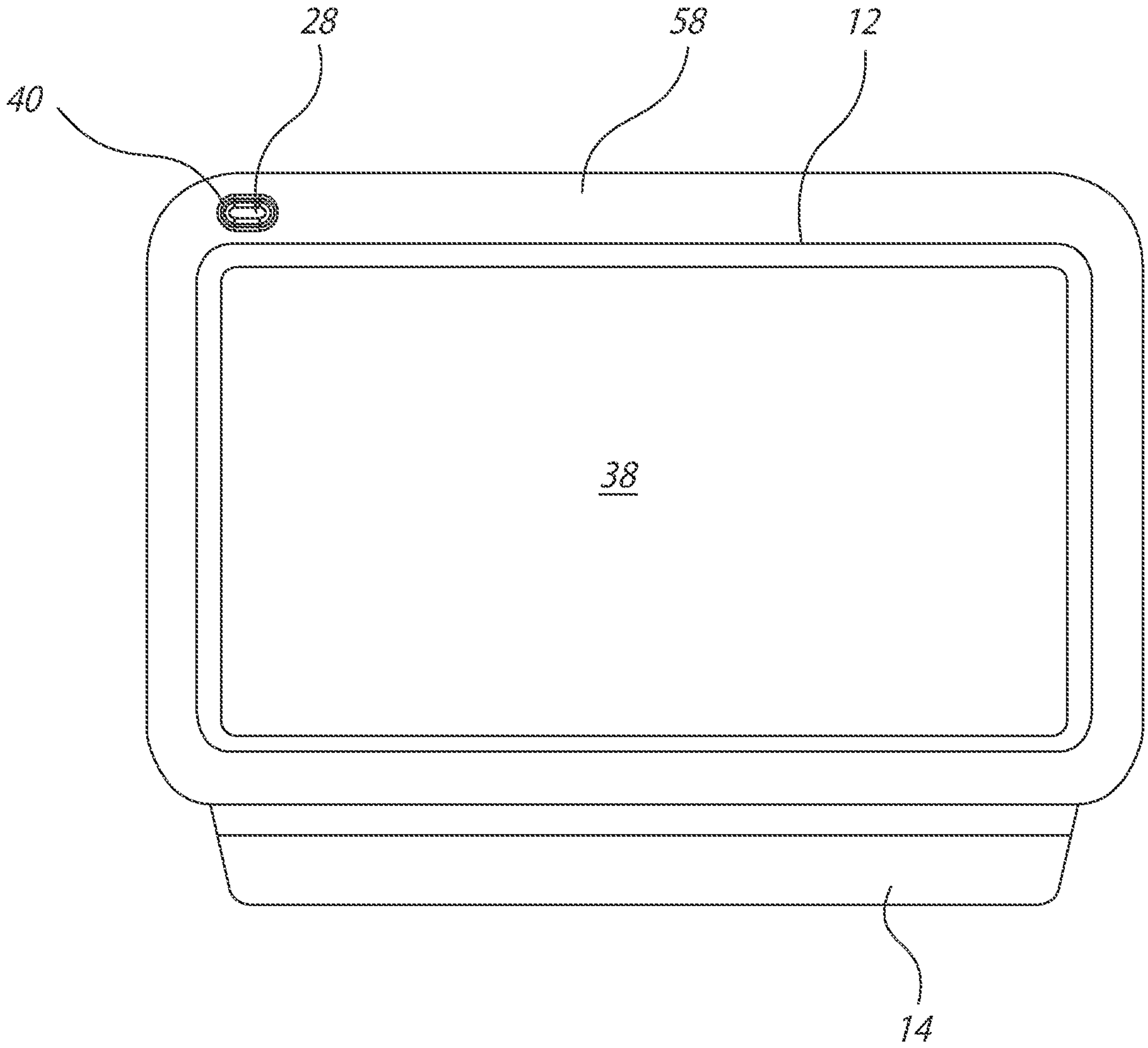
FIG. 4 is a front elevation of the oven shown in FIG. 1.
Figure 5:
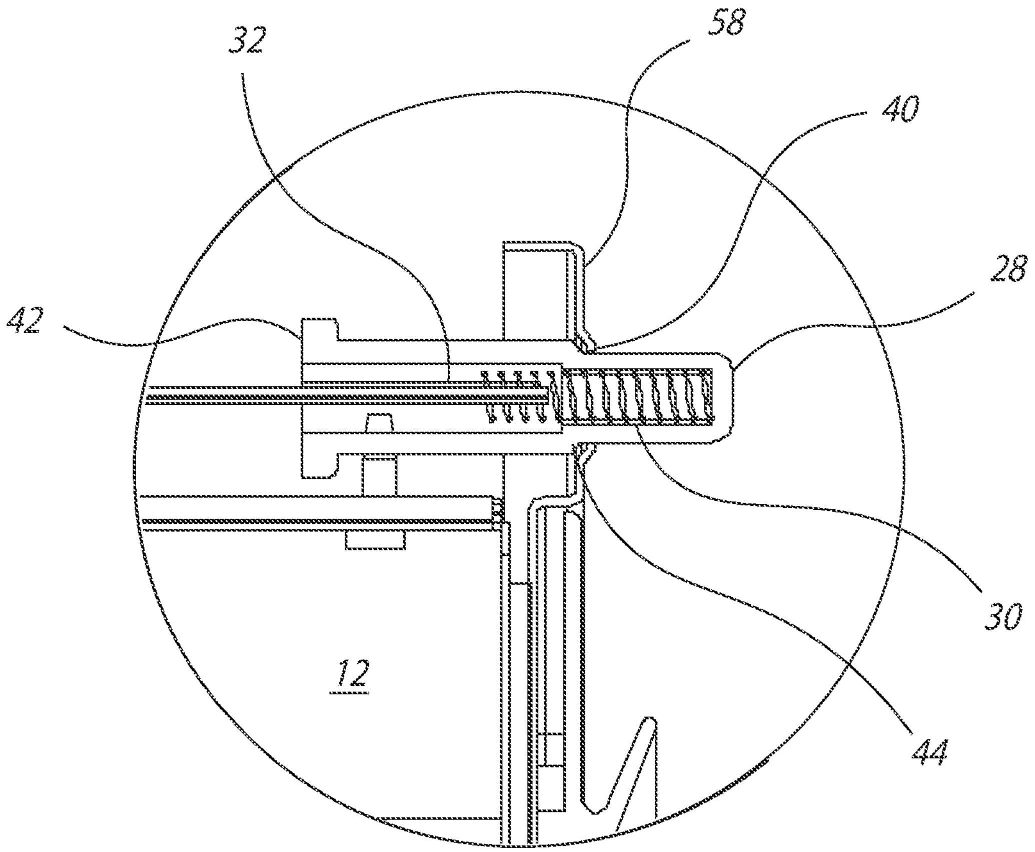
FIG. 5 is an enlarged partial section view of the spring-loaded pusher for pushing on the oven door.
Figure 6:
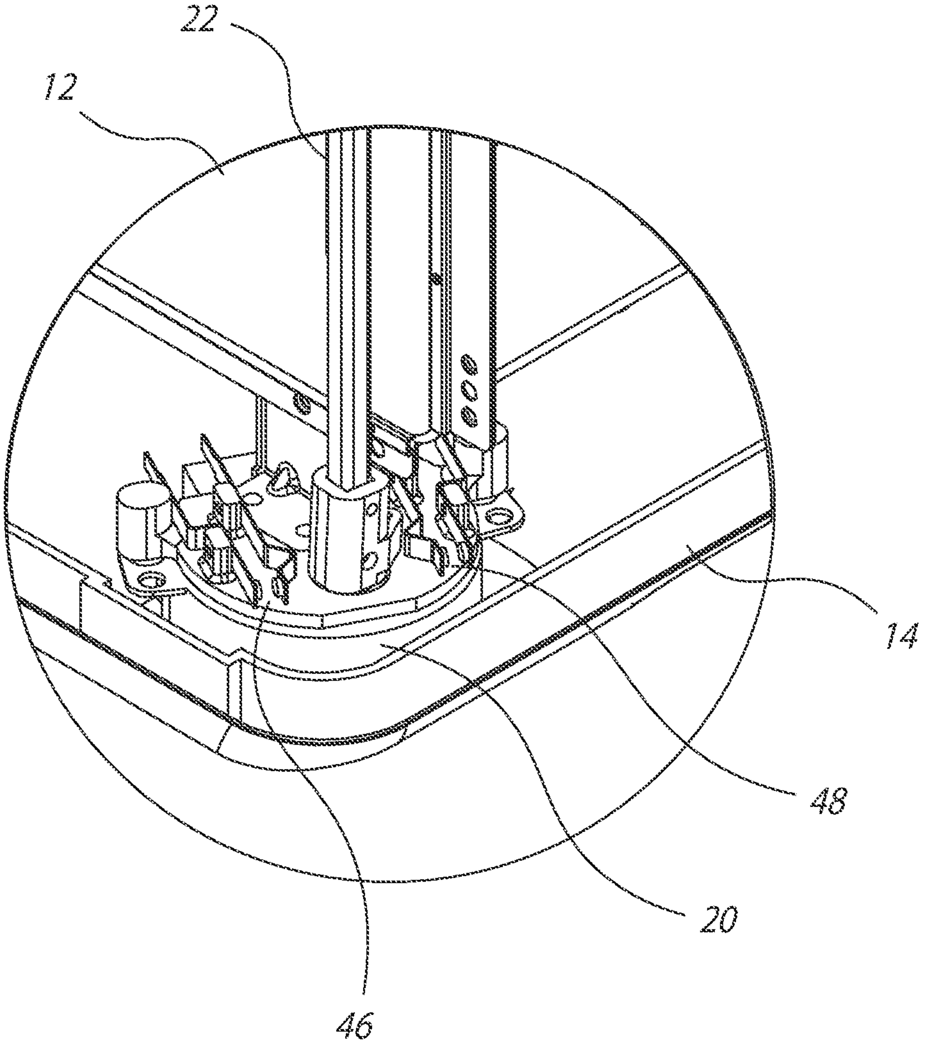
FIG. 6 is a partial enlarged perspective of the base of the vertical shaft driven by the electric motor to open and close the vent.
Figure 7:
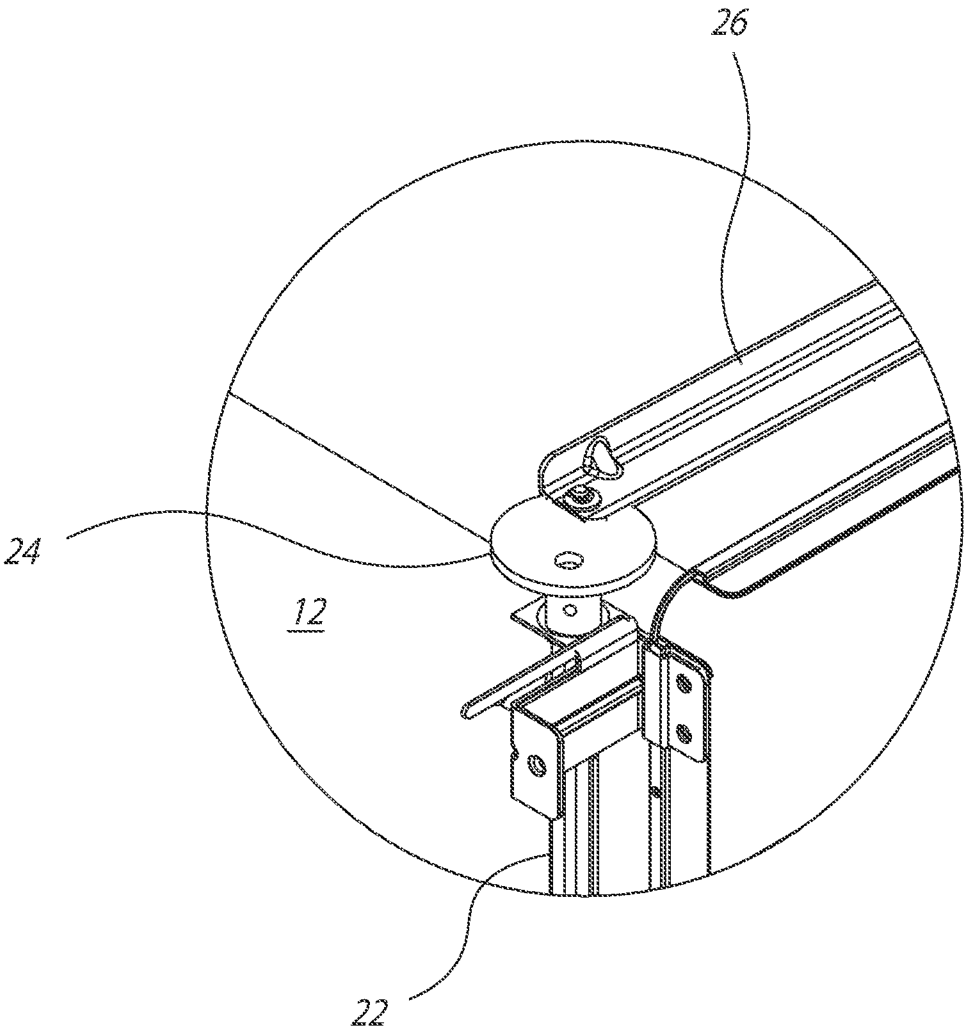
FIG. 7 is a partial enlarged perspective of the top of the vertical shaft with a circular linkage to the horizontal shaft for pushing and retracting the spring-loaded pusher.
Figure 8:
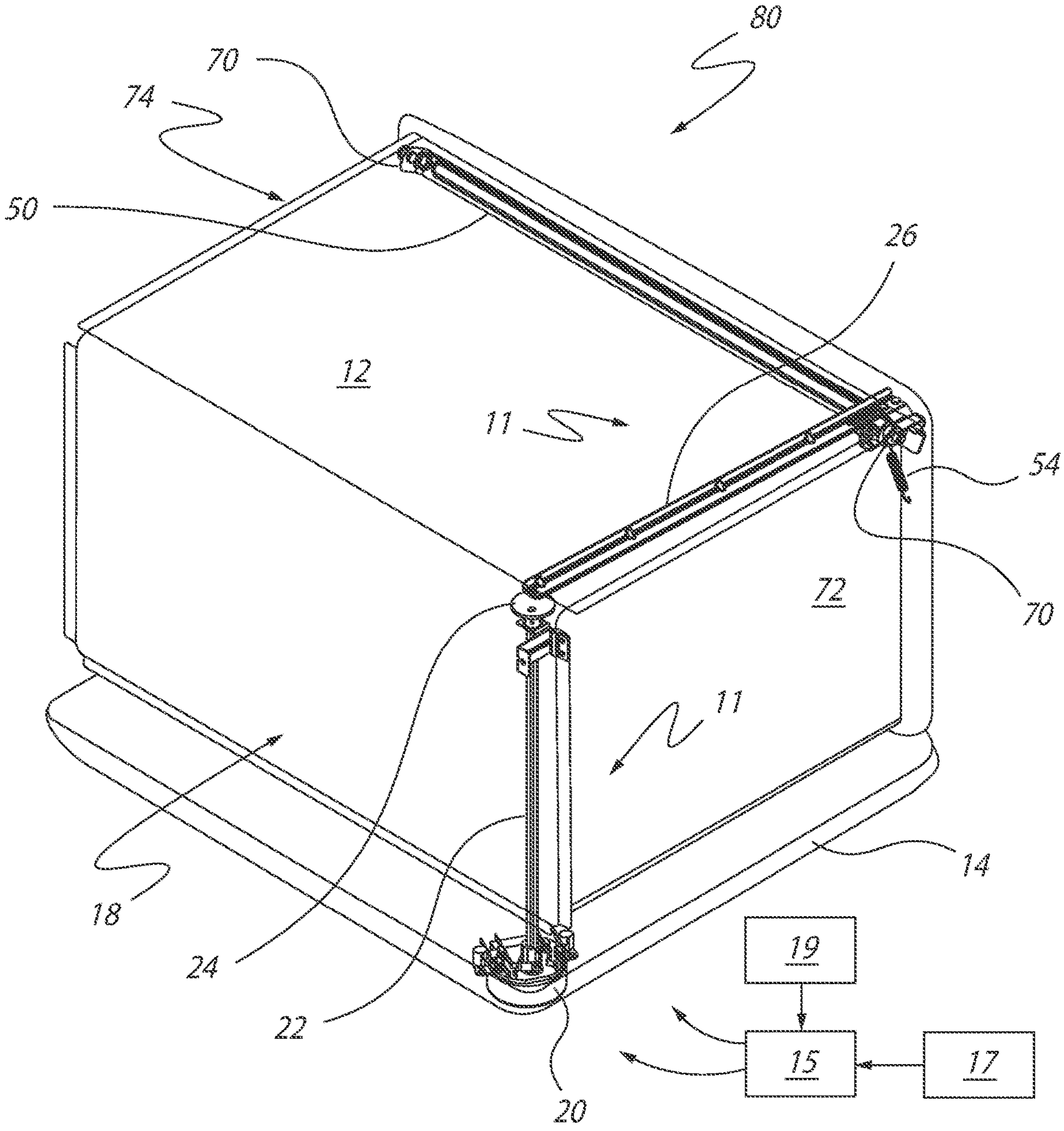
FIG. 8 is a perspective view of an oven according to a second embodiment in which the external casing and components have been removed.
Figure 9:
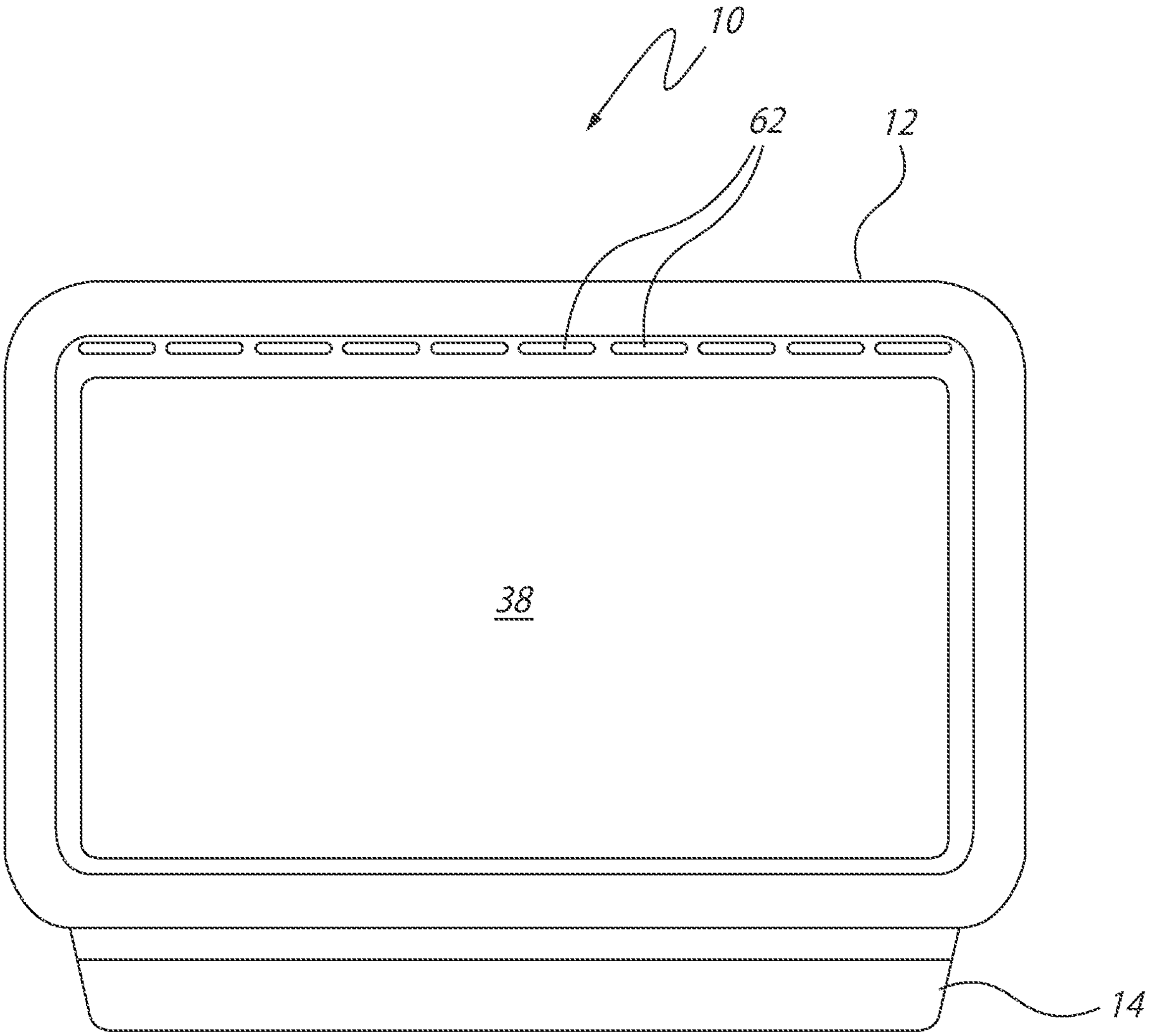
FIG. 9 is a front elevation of the second embodiment of the oven shown in FIG. 8.
Figure 10:
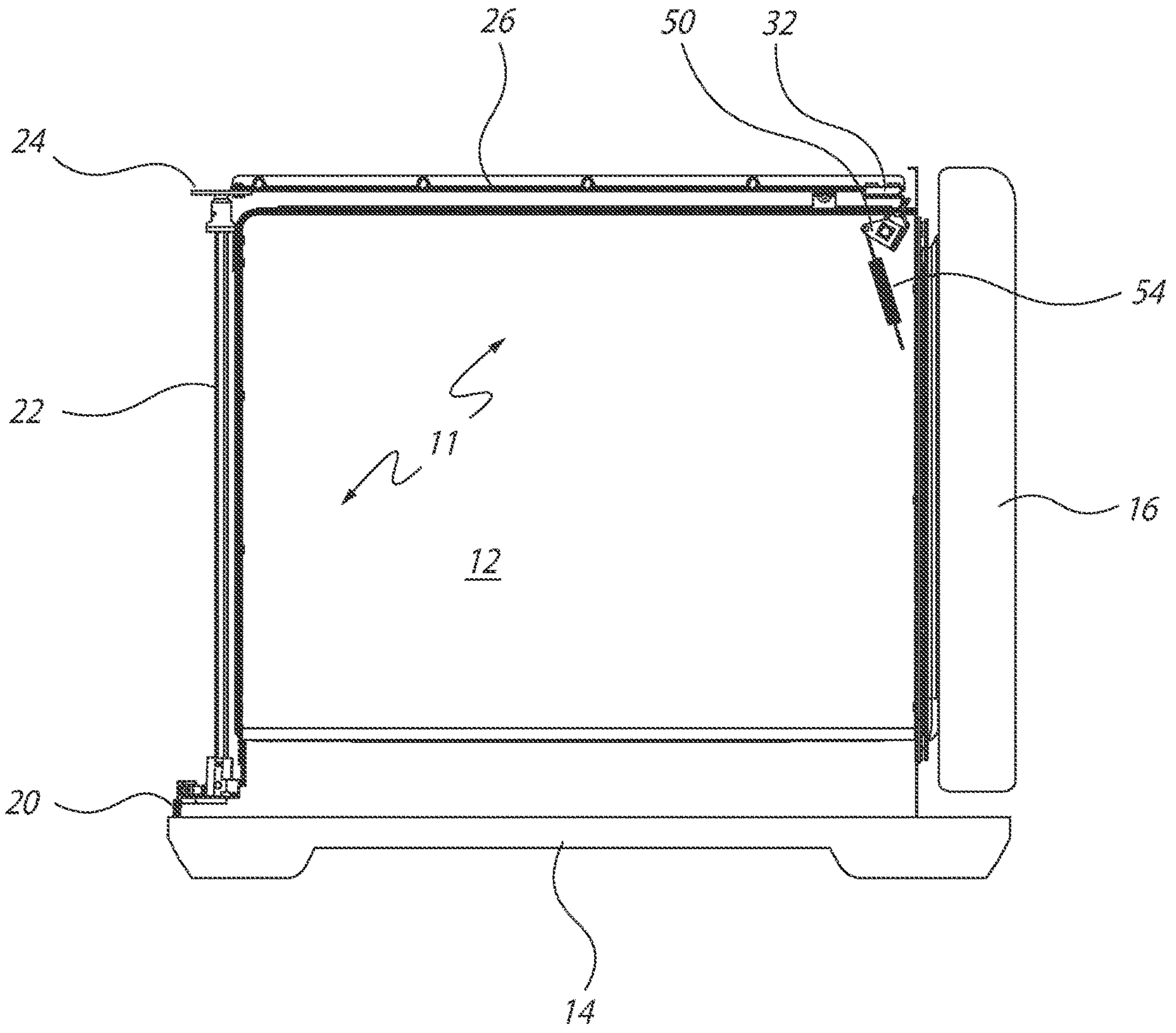
FIG. 10 is a left elevation of the oven shown in FIG. 8.

The front end 32 of the horizontal shaft 26 connects to a spring 30 housed in a stepped sleeve 42 such that compression of the spring 30 allows some relative movement between the sleeve 42 and the horizontal shaft 26. At the front of the stepped sleeve 42 is a push rod 28 that is dimensioned to fit through an aperture 40 in the peripheral flange 58 surrounding the front opening 38 of the cooking cavity 12 (as best shown in FIG. 4). However, an exterior step 44 (see FIG. 5) on the sleeve 42 does not fit through the aperture 40 thereby limiting the forwards movement of the push rod 28.

Figure 1:
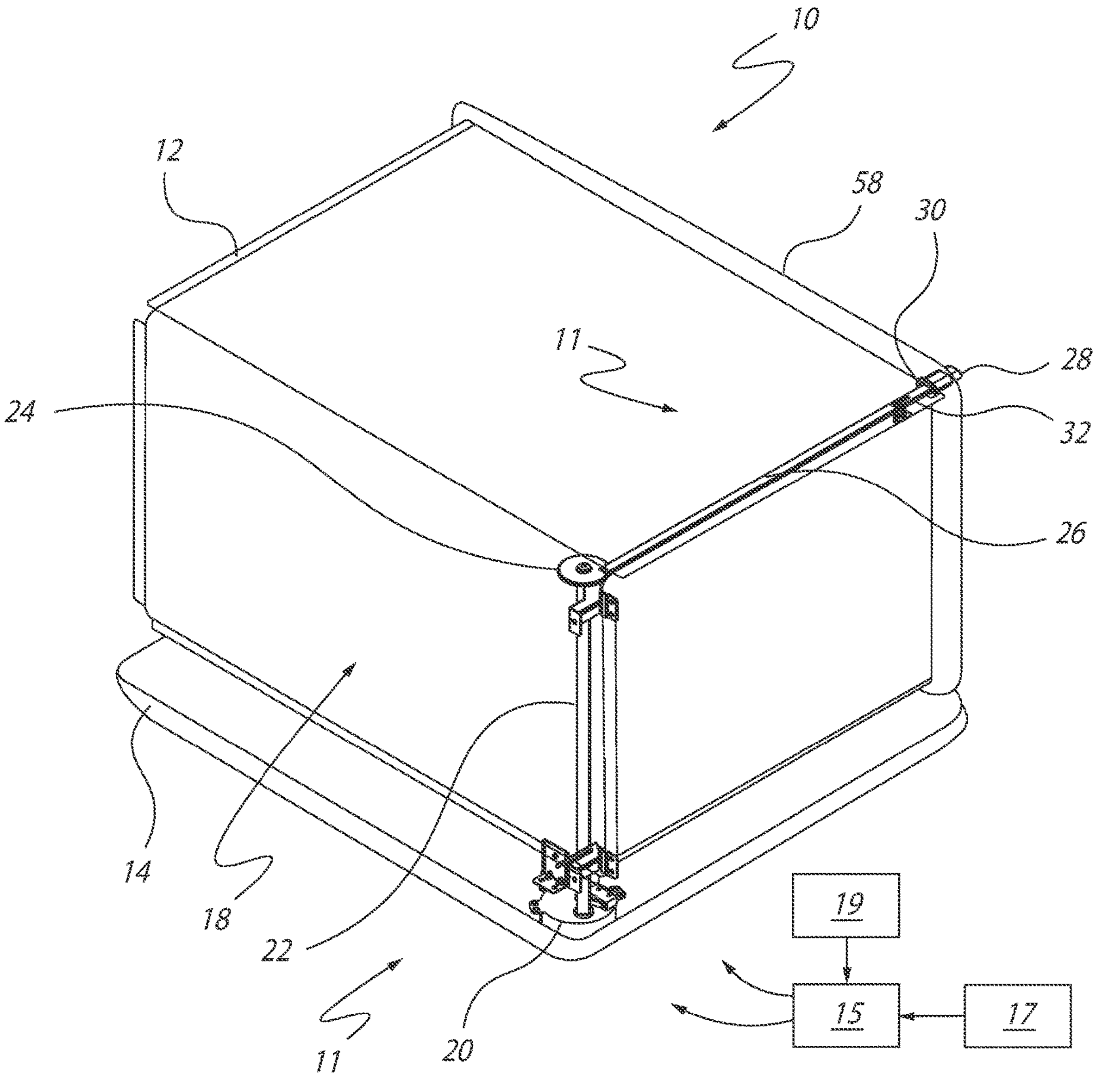
FIG. 1 is a perspective view of a first embodiment of an oven according to the present invention with the exterior panels about the cooking cavity removed.
Figure 2:
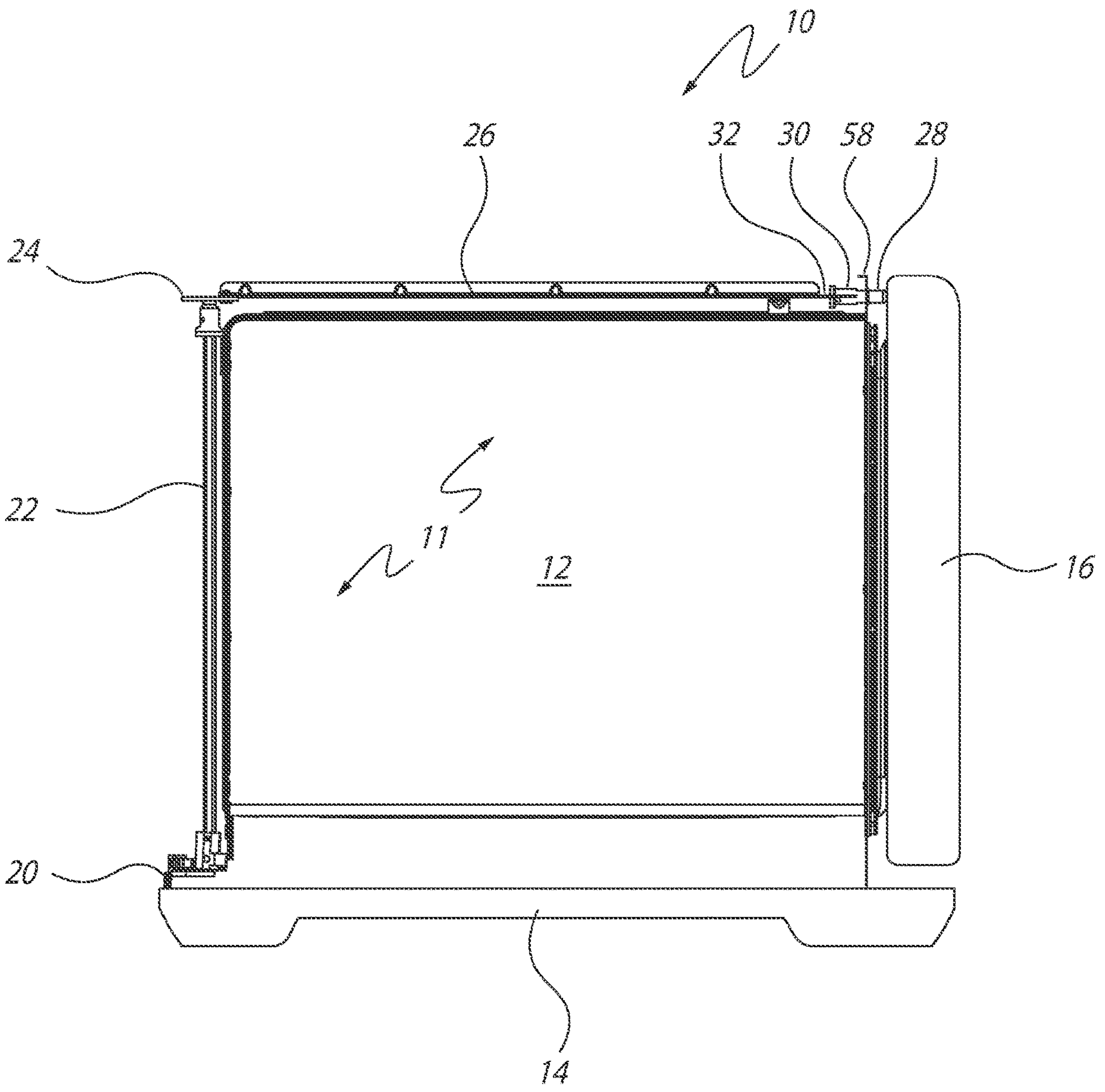
FIG. 2 is a left elevation of the oven shown in FIG. 1 with the vent in the closed position.
Figure 3:
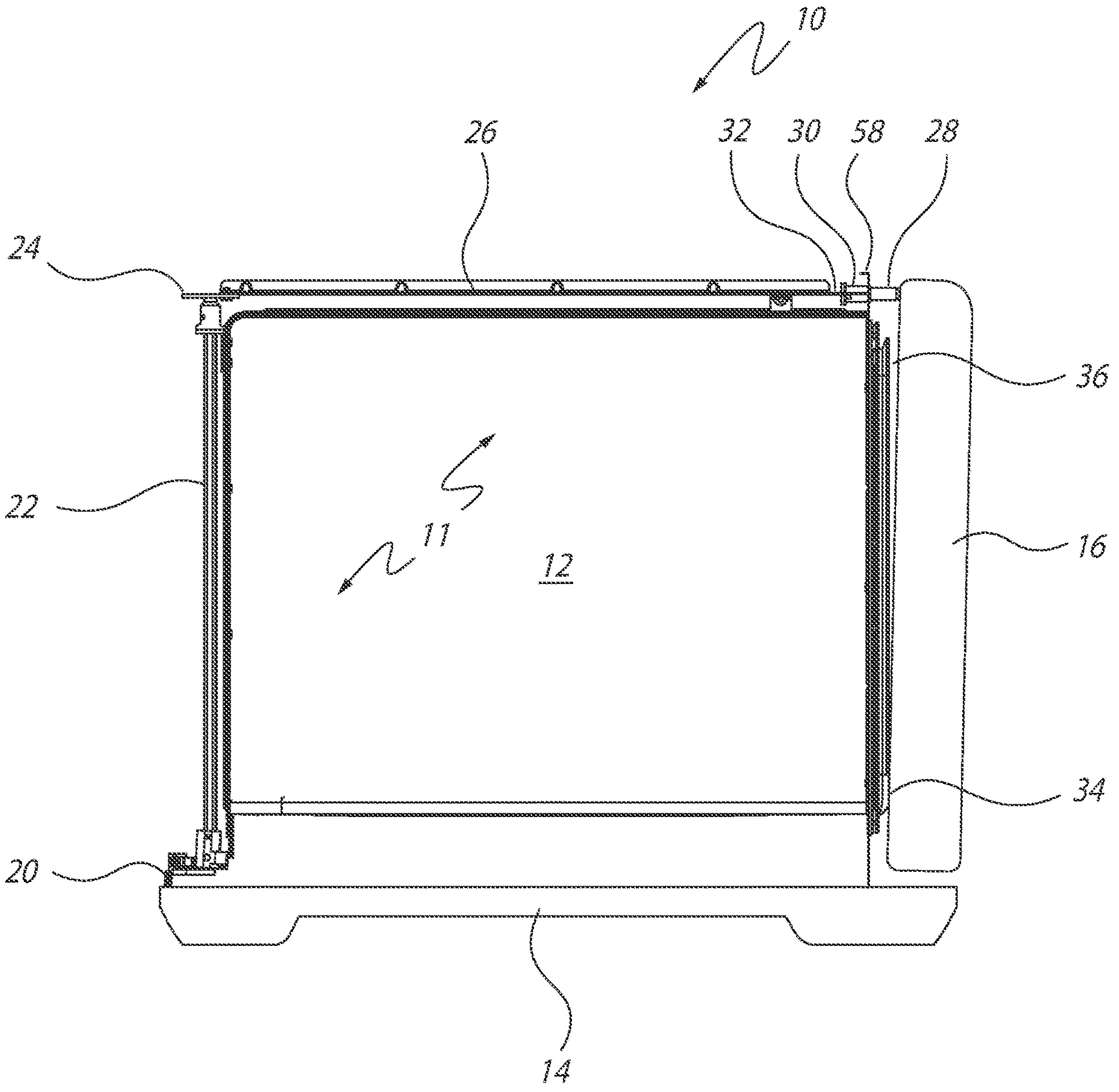
FIG. 3 is a left elevation of the oven shown in FIG. 1 with the vent in the open position.

As best shown in FIGS. 2 and 3, the spring-loaded push rod 28 pushes on the rear surface of the door 16 in response to forward movement of the horizontal shaft 26. The door 16 opens to a predetermined angle about the hinge 34 to provide a vent opening 36 such that the cavity 12 interior can vent to atmosphere. If the user sees the door 16 ajar and pushes it shut, the spring 30 provides a dampening mechanism by compressing to avoid damage to the horizontal shaft 26 and/or the linkage 24.

The vent opening 36 allows the processor 15 to control the humidity within the cooking cavity 12. During the designated cooking program (sometimes called the cooking profile), the cavity 12 is vented through a vent opening 36 of predetermined size, at pre-set time and for pre-set opening periods. Excess steam or humidity in the cooking cavity 12 is effectively released during the cooking process so the surface of the food reaches a higher temperature and crisps (if desired). Furthermore, the humidity release reduces the risk of a dangerous steam blast upon opening the oven door 16. Periodic venting allows improved results from cooking modes such as 'Airfry' and 'Dehydrate' which requires the cooking cavity 12 to be opened multiple times during the cooking process.

In some cooking programs, the control processor 15 will completely close the vent opening 36 after the pre-set venting period. Optionally, the processor 15 will partially retract the push rod 28 for a smaller vent opening 36 to provide a constant steam release at a reduced vent rate while maintaining the required cooking temperature. The vent opening times, venting rates (i.e. size of vent opening 36), and the opening periods are dependent on one or more of:

- the food type;
- current cooking function (for example, the door may not be closed after opening during cooking);
- an upcoming cooking program, function, or cooking profile;
- required cooking temperatures; and,
- set cooking times.

Upon completion of the cooking program, the user interface 17 indicates the current cooking status as 'cooking complete' and informs the user that the cooking cavity 12 is about to automatically vent. The vent opening 36 is then fully or partially opened for a predetermined period to release steam from the cooking cavity 12 so as to preserve the food structure and texture. Furthermore, venting the cooking cavity 12 rapidly reduces oven temperature to avoid the food being over-cooked.

Some cooking programs provide a 'keep warm' function upon completion of the cooking. The automatic venting helps to transition the oven 10 from cooking mode to the keep warm mode without deterioration of the food texture.

After the pre-determined period, the vent opening 36 may be closed, or optionally partially closed to reduce the venting rate while maintaining a pre-determined temperature in the cooking cavity 12. The venting rates (i.e. vent opening 36 size), and the opening periods are dependent on one or more of:

- the food type;
- current cooking function (for example, the door may not be closed after opening during cooking)
- an upcoming cooking program, function, or cooking profile;
- required cooking temperatures; and,
- set cooking times.

Another form of the vent actuator (not shown in the figures), positions the motor 20 towards top of the cavity 12 (beneath the external casing of the oven). The motor output has a linkage to a shaft functionally similar to the linkage 24 and the horizontal shaft 26 of the first embodiment 10. The motor driven linkage is translated to the forward and rearward movement of the shaft with a spring-loaded sleeve and push rod connected to the front end. As with the push rod 28 of the first embodiment of the oven 10, the oven door 16 may be opened a pre-determined amount by pressing on the rear surface. Also, the spring loading protects the shaft, linkage and motor if the user presses the door shut.

A second embodiment of the oven 80 is shown in FIGS. 8 to 16. As with the first embodiment, the oven 80 is shown without an external casing or panels to expose the cooking cavity 12 supported on a base 14. The cooking cavity 12 has a door 16 hinged to the front for user access to the cavity interior. The oven 80 has a means of generating heat 18 such as an electric heating element (not shown) to cook the food within. The cooking process is controlled by a control processor 15 in accordance with inputs from a user interface 17 and feedback sensors 19 (schematically depicted in FIG. 8).

Again, the vent actuator 11 includes a motor 20 at the rear left-hand lower corner of the oven 10 is coupled to the bottom of a vertical shaft 22. The vertical shaft 22 extends to a linkage 24 at the top rear left corner. The linkage 24 connects the vertical shaft 22 to a horizonal shaft 26 such that rotation of the vertical shaft 22, rotates the linkage 24 which in turn provides axial movement of the horizontal shaft 26. In this way, partial rotations of the linkage 24 in opposite directions provide reciprocating axial movement of the horizontal shaft 26.

The front end 32 of the horizontal shaft 26 connects to a curved abutment surface 68 that mounts to the cavity 12 for sliding movement together with the reciprocating movement of the horizontal shaft 26. The curved abutment surface 68 pushes against a flap tilt lever 66 fixed to an elongated sealing flap 50 extending through the cavity 12 between the left sidewall 72 and the right sidewall 74. The sealing flap 50 is rotatably mounted to the left and right sidewall 72 and 74 respectively, via a left and right flap axle 56 fixed to the flap end plates 70. The flap tilt lever 66 is fixed to the left end plate 70 such that forward movement of the abutment surface 68 rotates the sealing flap 50 against the bias of a return spring 54 also connected to the left end plate 70.

Figure 11:
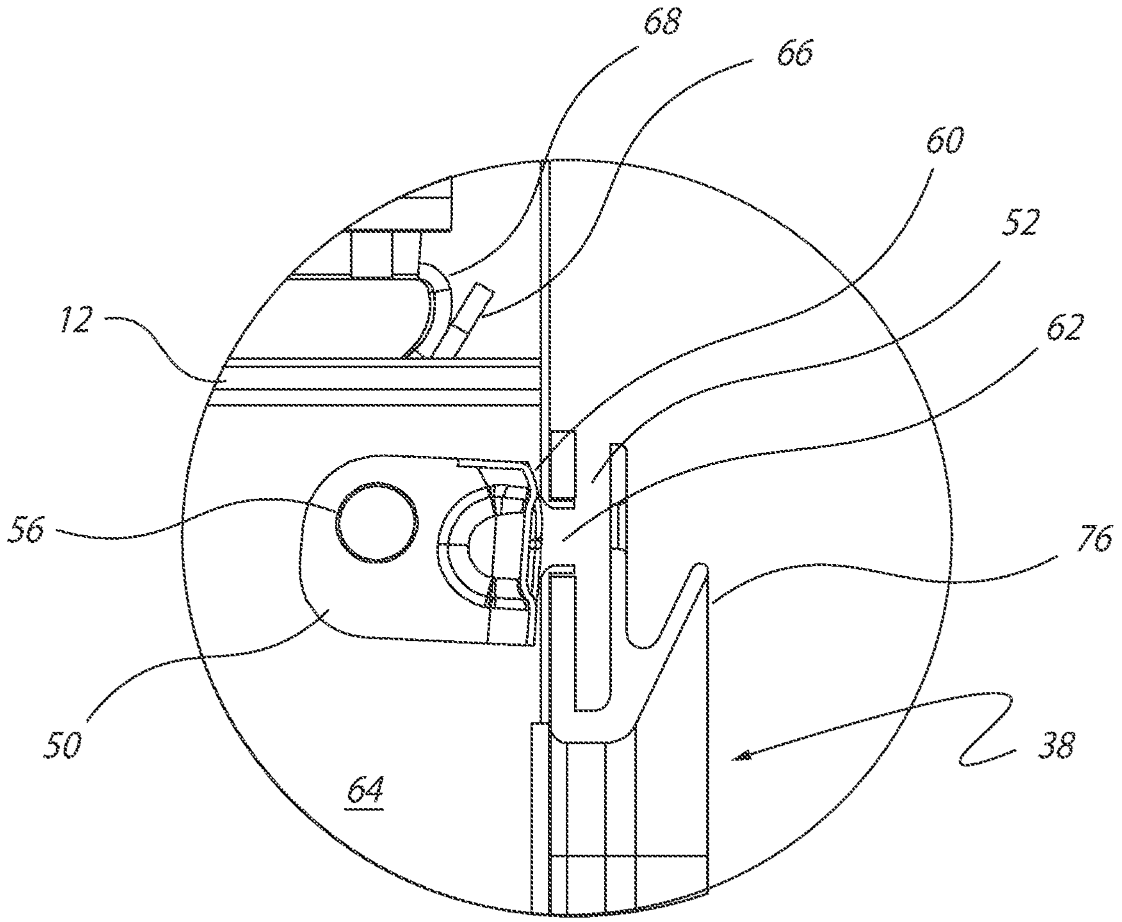
FIG. 11 is an enlarged partial sectioned view of the vent used in the second embodiment in a closed position.

FIG. 11 shows the vent flap 50 in the closed position with flap sealing face 60 covering the vent opening 62. The vent opening 62 is provided in form of a series of slots extending along the top of the oven seal 76 surrounding the front opening 38 of the cavity 12. The oven seal 76 provides a peripheral seal against the rear of the door 16 when the door is closed. With the oven door closed, and the vent flap 50 in the closed position, the cavity interior 64 is sealed from atmosphere.

Figure 12:
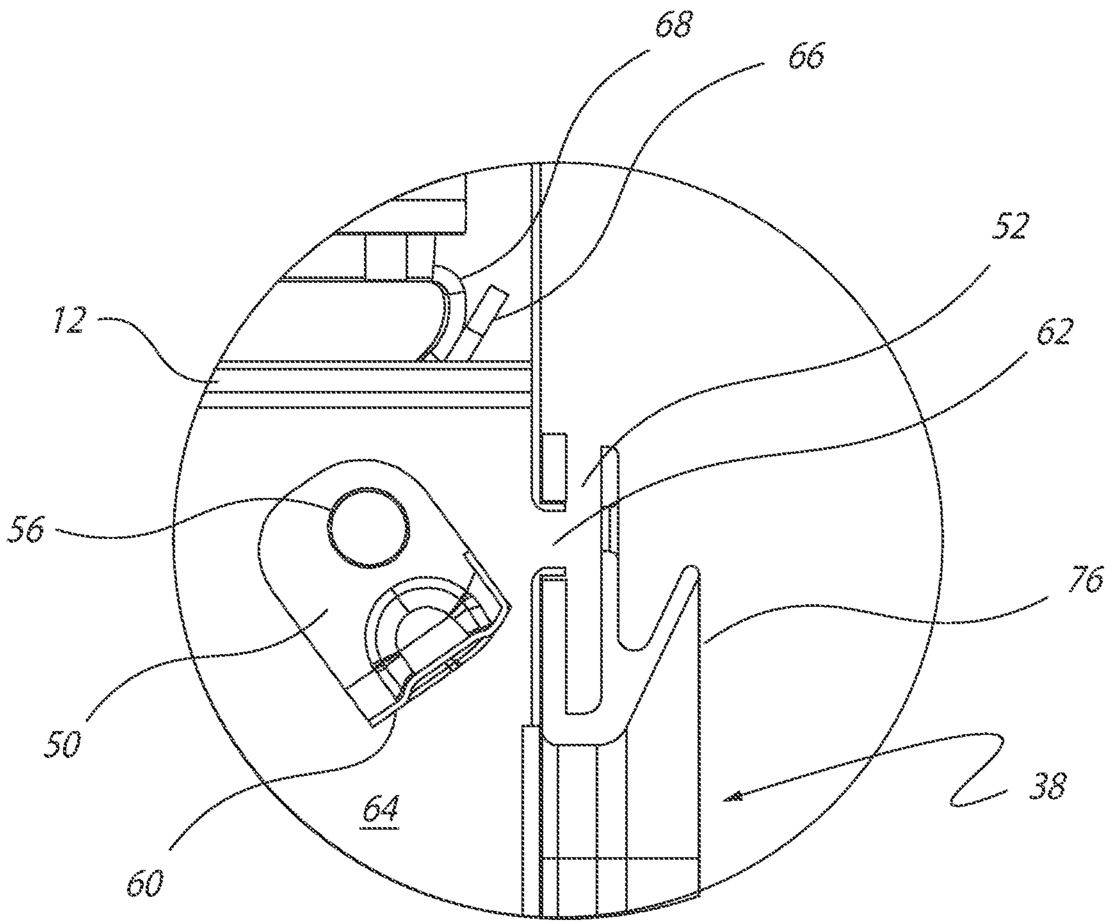
FIG. 12 is a partial enlarged sectioned view of the vent of FIG. 11 moved to the open position.
Figure 13A:
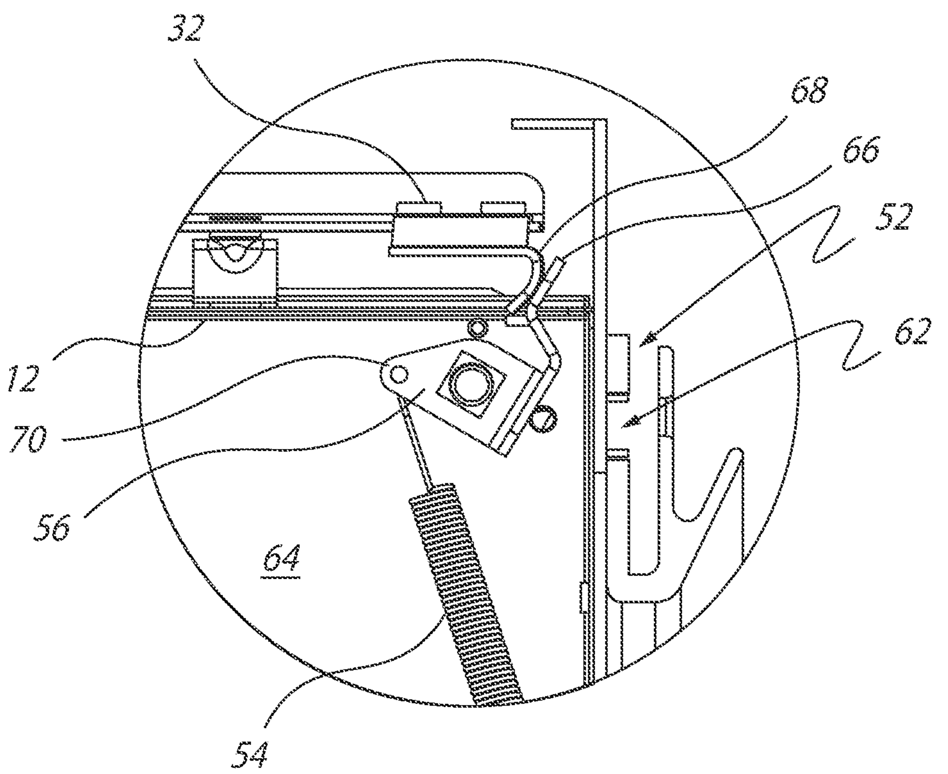
FIG. 13A is a partial enlarged sectioned view of the second embodiment of the vent in an open position.
Figure 13B:
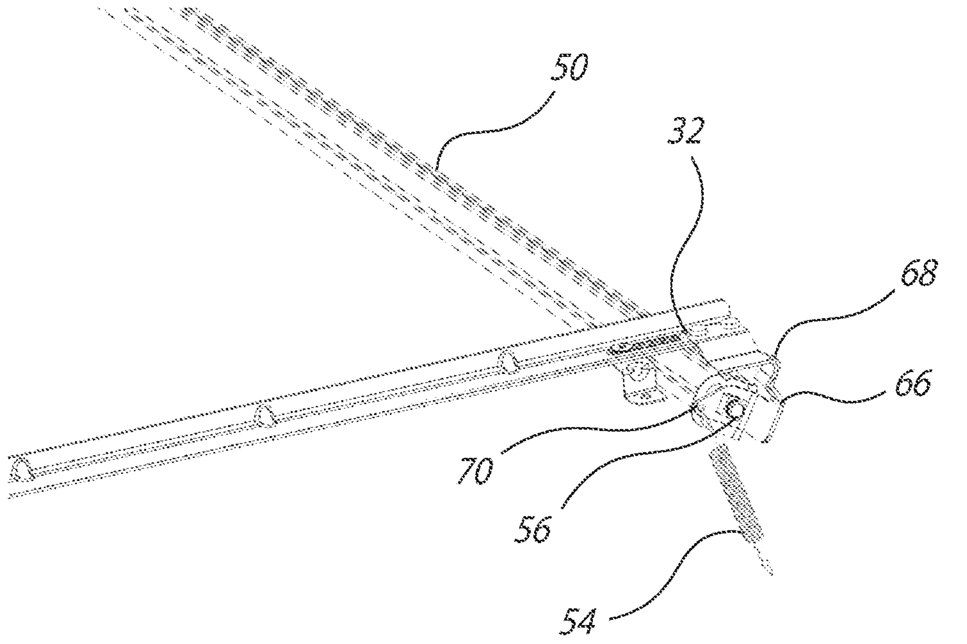
FIG. 13B is a partial perspective view of the second embodiment of the vent shown in FIG. 13A.
Figure 14:
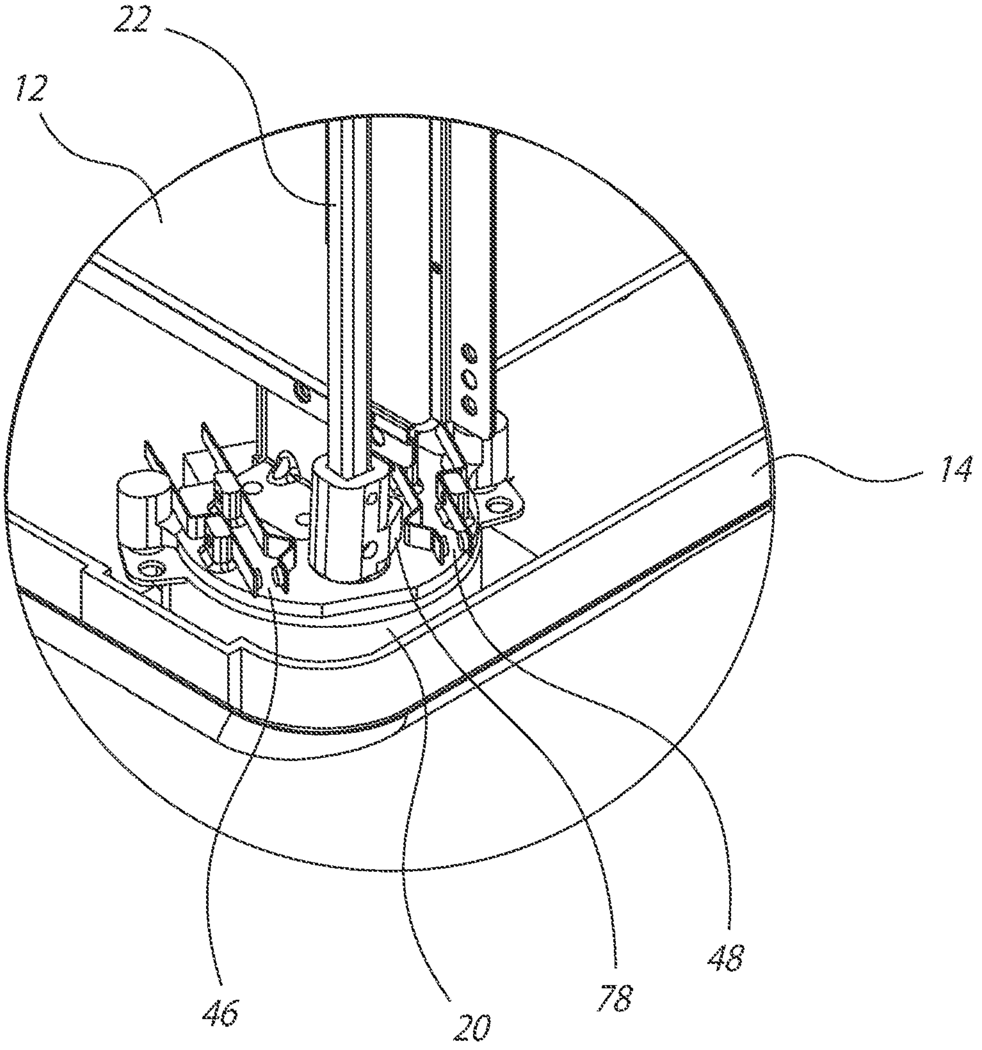
FIG. 14 shows the base of the vertical shaft with the drive motor for operating the vent according to the second embodiment.
Figure 15:
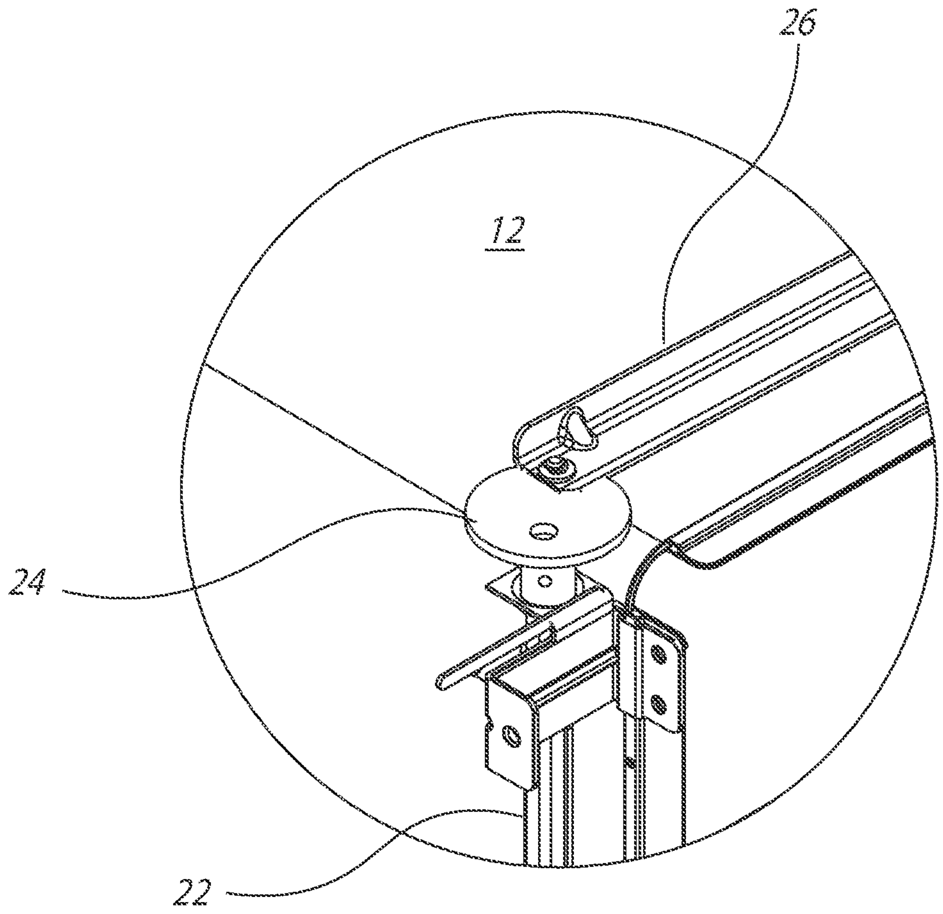
FIG. 15 is a partial enlarged perspective of the top of the vertical shaft with circular linkage to the horizontal shaft for moving the vent between the open and closed positions.
Figure 16:
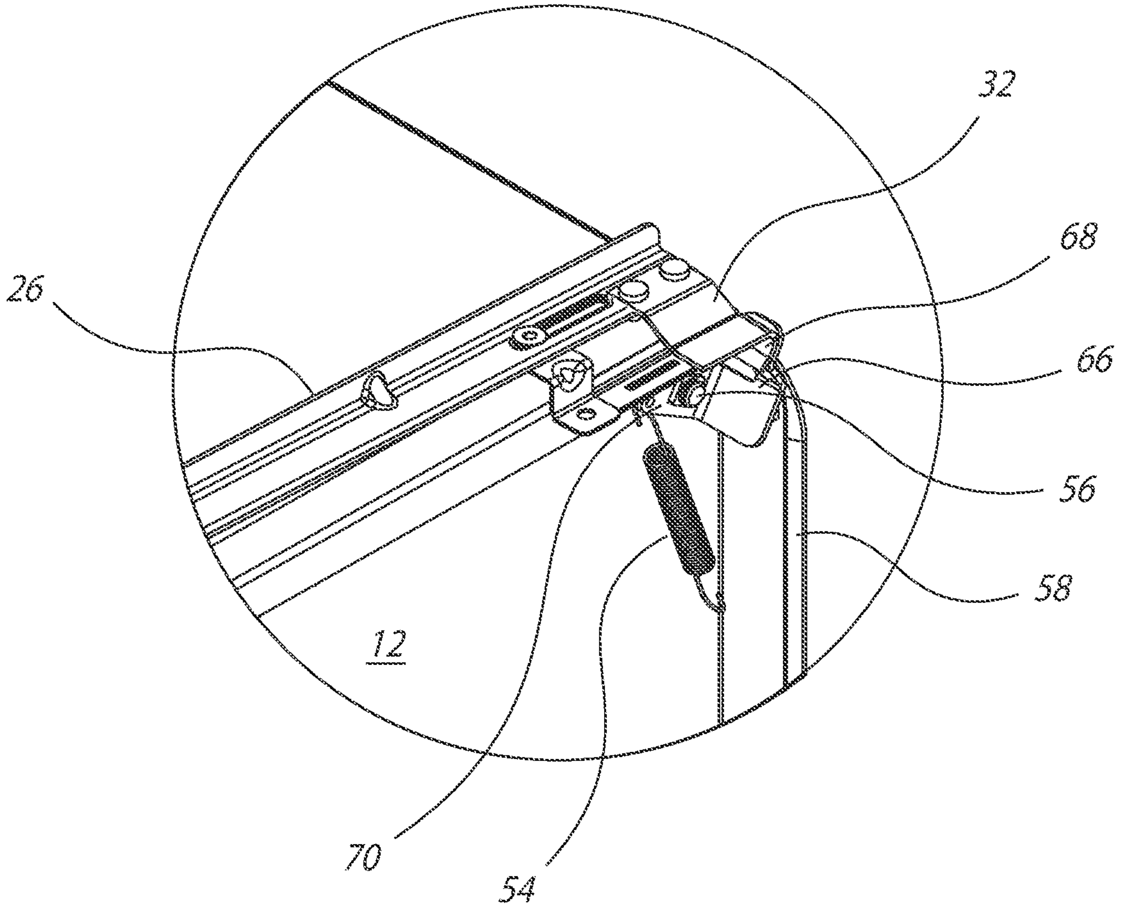
FIG. 16 is a partial enlarged perspective of the front end of the horizontal shaft with curved abutment surface pushing on flap tilt lever for moving the vent between the open and closed positions.
Figure 17:
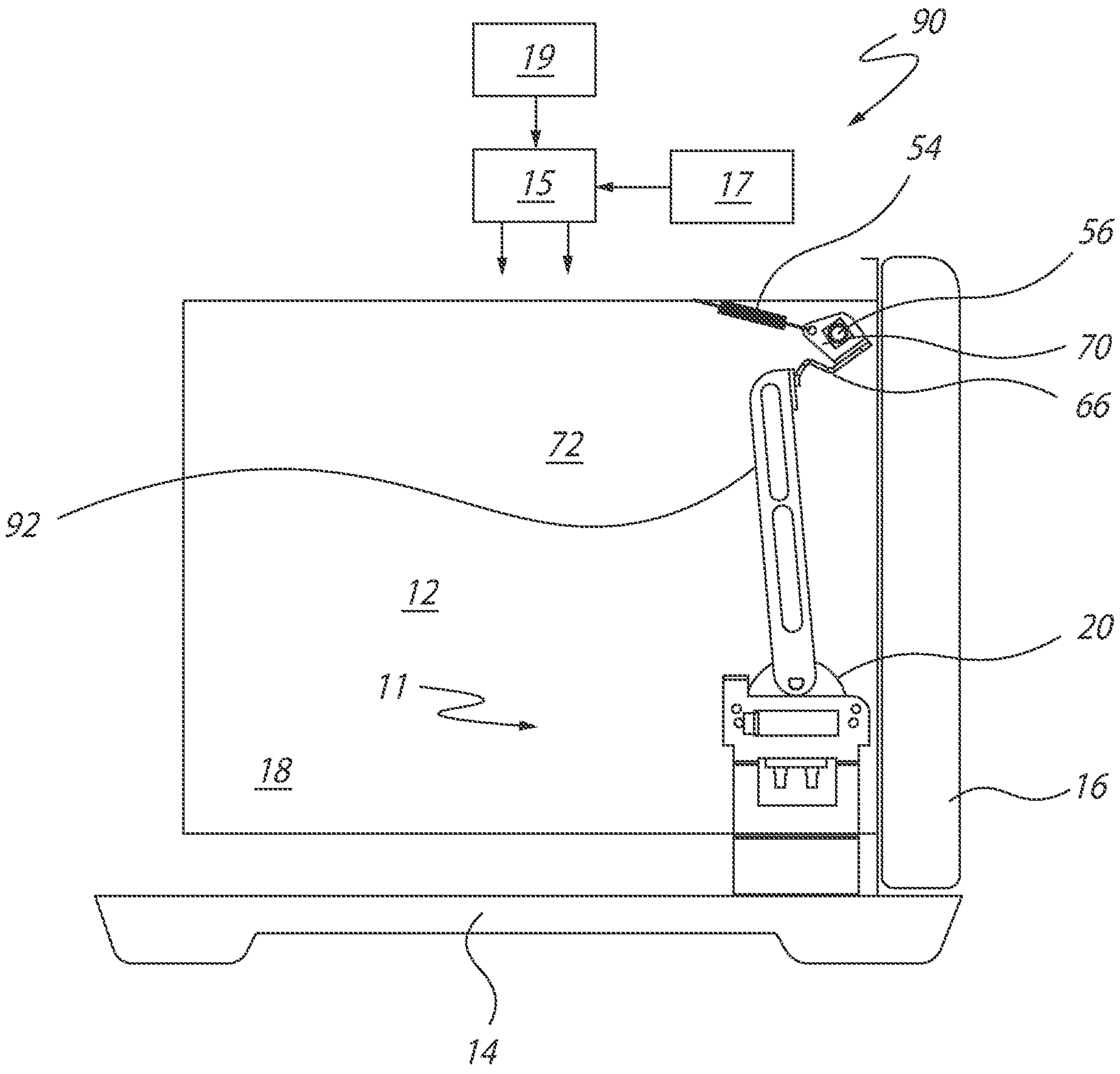
FIG. 17 is a left elevation of the third embodiment of the third embodiment of the oven with the vent in the open position.
Figure 18:
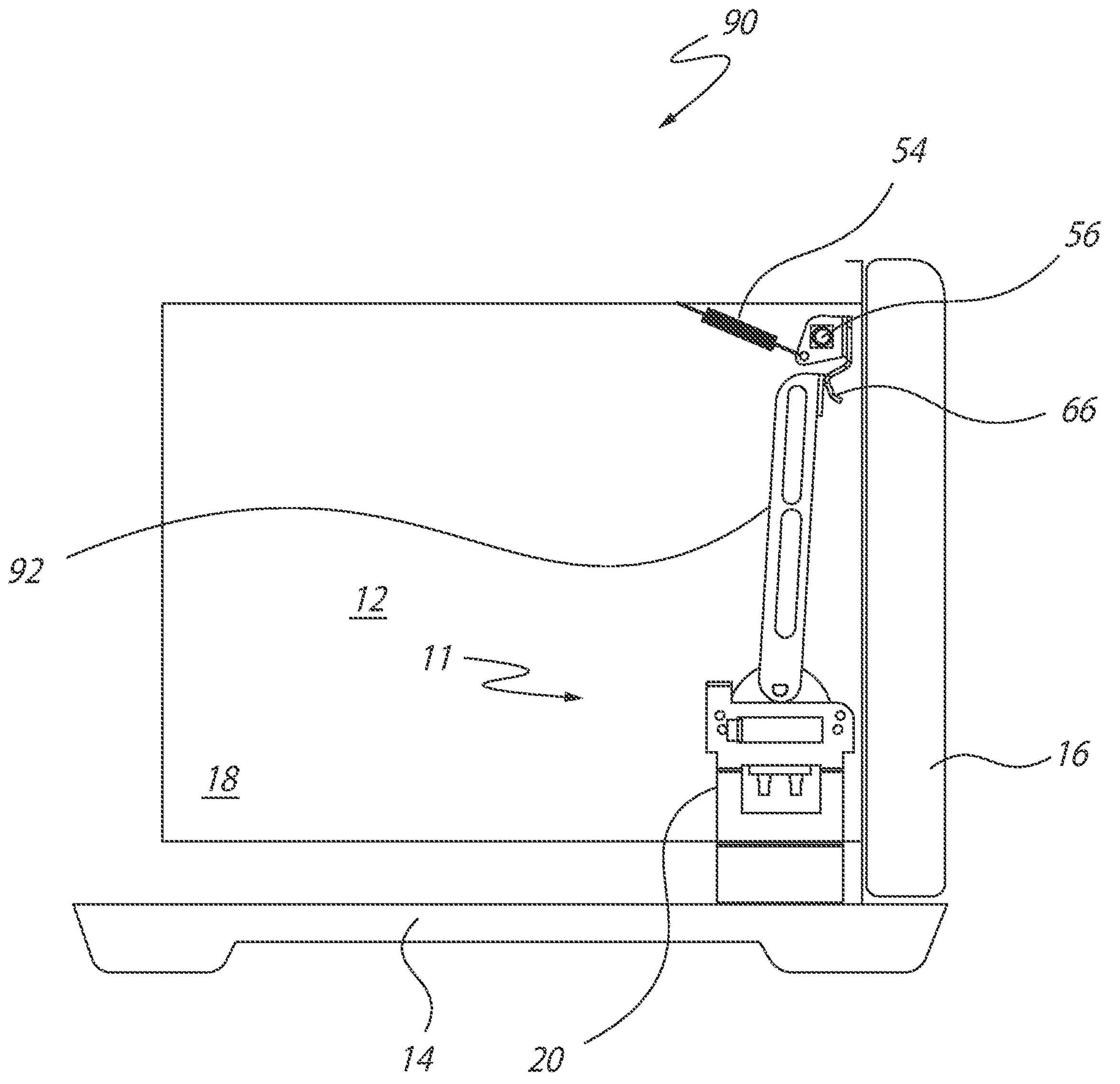
FIG. 18 is a left elevation of the oven shown in FIG. 17 with the vent in the closed position.

FIGS. 12, 13A and 13B show the vent flap 50 rotated to the open position by the abutment surface 68 pushing the flap tilt lever 66. The flap sealing face 60 rotates away from the openings 62 so steam/humidity can vent to atmosphere via the open groove 52 and/or the vent openings 62 behind the oven seal 76. This embodiment of the vent does not involve moving the door 16 in order to open and close. However, the humidity vent rate can be controlled using through variation of the opening time periods and/or opening frequency. The size of the vent opening may also varied with control of the rotation of the sealing flap 50. As shown in FIG. 14, a cam 78 on the vertical shaft coupling opens and closes the switches 46 and 48 to delimit the forward and rearward travel of the horizonal shaft 26 and thereby the abutment surface 68. While two switches 46 and 48 are shown, additional switches or other rotation sensors can provide more precise control of the angular position of the vertical shaft 22.

FIGS. 17 to 20 show a third embodiment of the oven 90 in which the vent actuator 11 rotates vent flap 50 by a swing arm 92 driven by a motor 20 near the front of the cooking cavity 12. As with the first and second embodiments, the oven 90 is shown without an external casing or panels to expose the cooking cavity 12 supported on a base 14. The cooking cavity 12 has a door 16 hinged to the front for user access to the cavity interior. The oven 90 has a means of generating heat 18 such as an electric heating element (not shown) to cook the food within. The cooking process is controlled by a control processor 15 in accordance with inputs from a user interface 17 and feedback sensors 19 (schematically depicted in FIG. 27).

The motor 20 is positioned toward the front of the cooking cavity 12 in this embodiment to actuate a swing arm 92. The swing arm 92 is fixed to the motor 20 to sweep through a defined arc along the left sidewall 72 of the cavity 12. The swing arm 92 pushes on the flap tilt lever 66 against the bias of the return spring 54. The flap tilt lever 66 is fixed to the elongated sealing flap 50 extending through the cavity 12 between the sidewalls. The sealing flap 50 is rotatably mounted to the cavity 12 via a left and right flap axle 56 fixed to the flap end plates 70. The flap tilt lever 66 is fixed to the left end plate 70 such that clockwise rotation of the swing arm 92 rotates the sealing flap 50 against the bias of a return spring 54 also connected to the left end plate 70.

Figure 19:
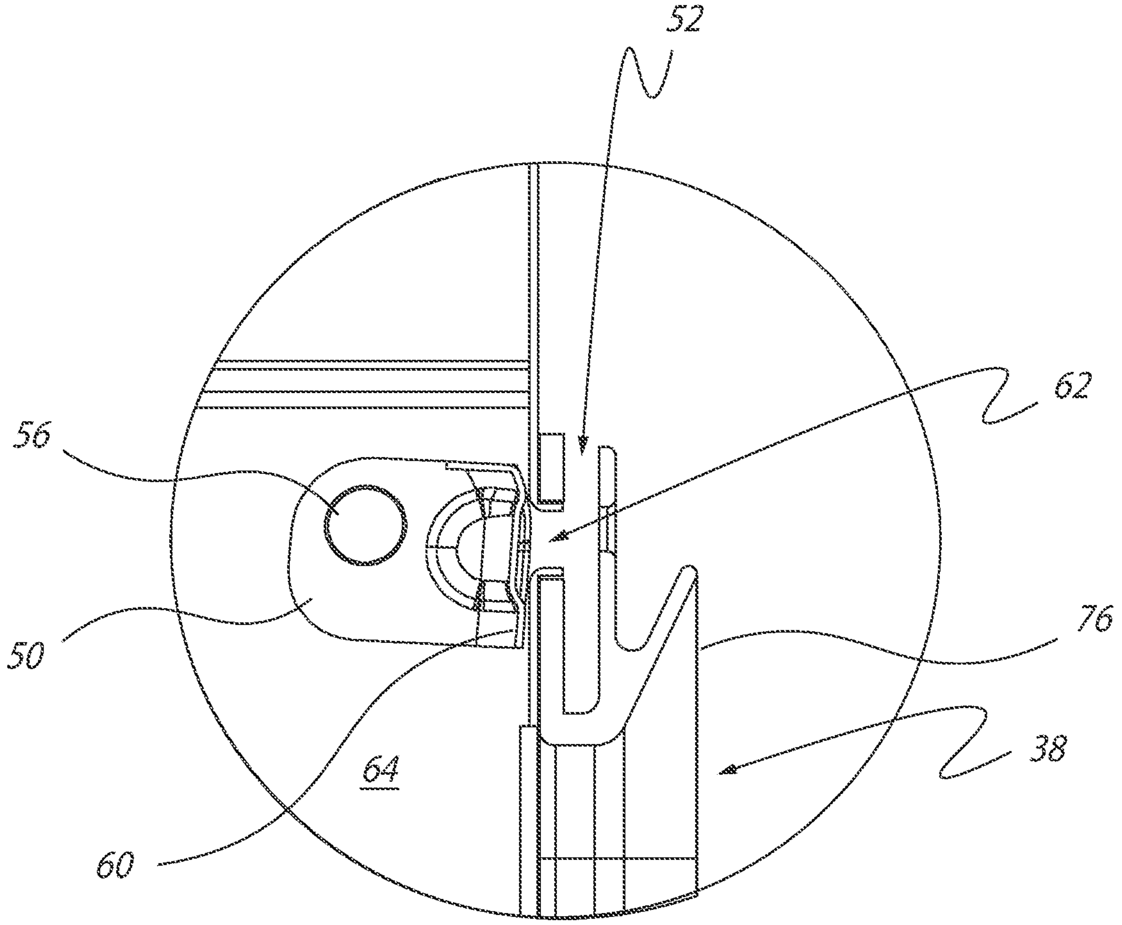
FIG. 19 is an enlarged partial sectioned view of the vent sealing flap in the closed the position.

FIG. 19 shows the vent flap 50 in the closed position with flap sealing face 60 covering the vent opening 62. The vent opening 62 is provided in form of a series of slots extending along the top of the oven seal 76 surrounding the front opening 38 of the cavity 12. The oven seal 76 provides a peripheral seal against the rear of the door 16 when the door is closed. With the oven door closed, and the vent flap 50 in the closed position, the cavity interior 64 is sealed from atmosphere.

Figure 20:
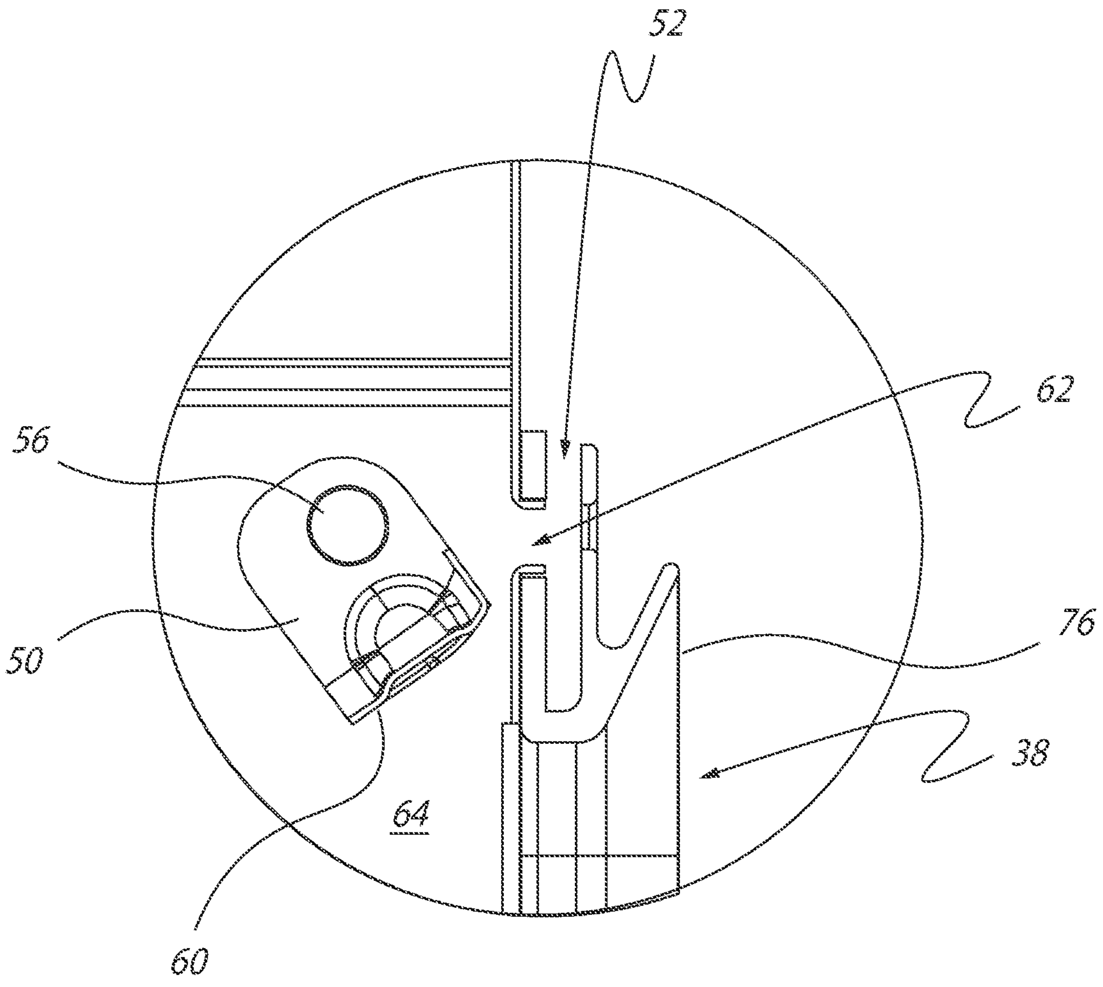
FIG. 20 is an enlarged partial sectioned view showing the vent body in the open position to expose the vent opening.
Figure 21:
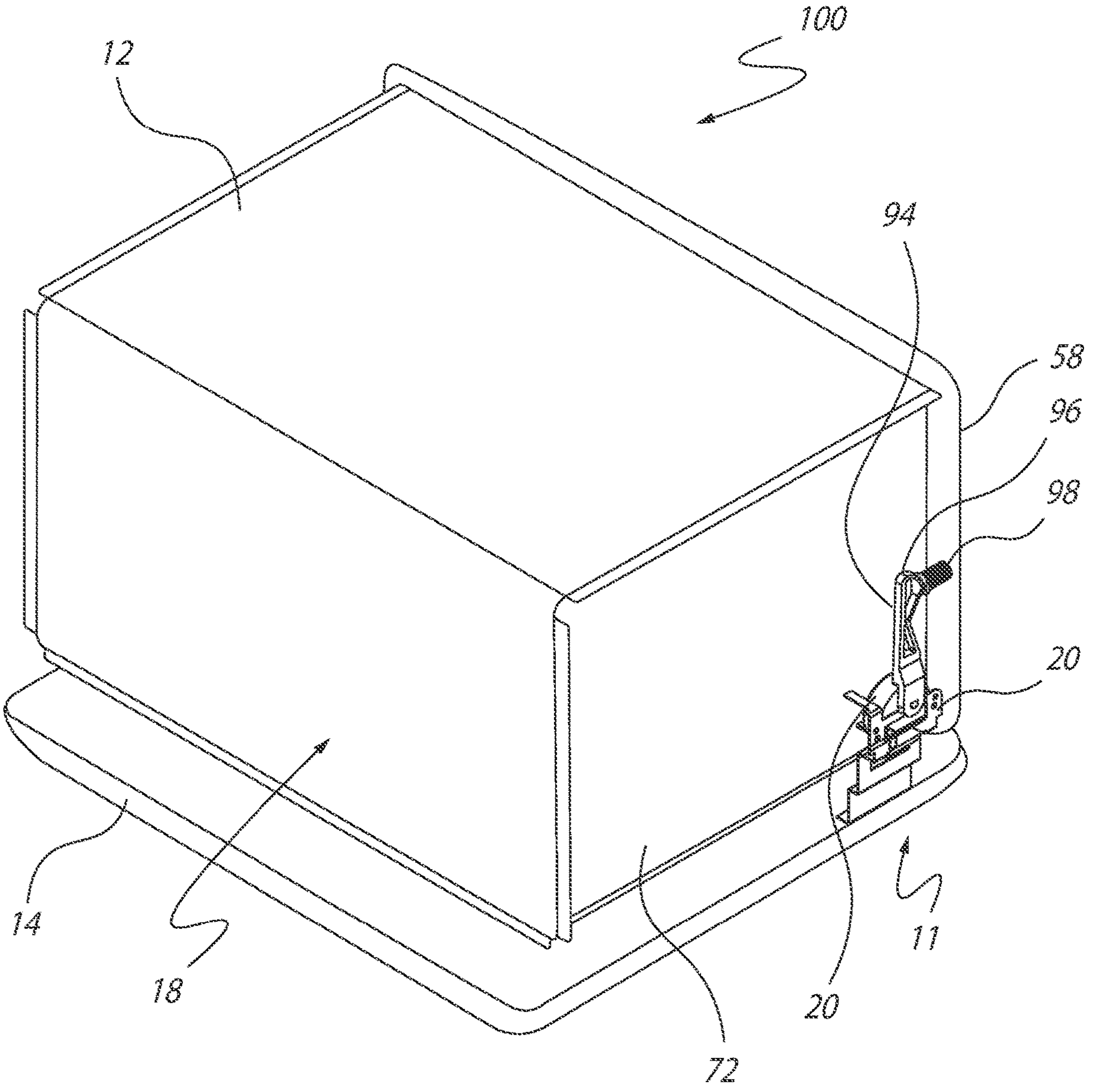
FIG. 21 is a perspective view of a fourth embodiment of the oven.

FIG. 20 shows the vent flap 50 rotated to the open position by the abutment surface 68 pushing the flap tilt lever 66. The flap sealing face 60 rotates away from the openings 62 so steam/humidity can vent to atmosphere via the open groove 52 behind the oven seal 76. Like the second embodiment 80, this embodiment of the oven 90 uses a vent 50 that does not involve moving the door 16 in order to open and close. However, the humidity vent rate can be controlled using through variation of the opening time periods and/or opening frequency. The size of the vent opening can be adjusted with control of the rotation of the swing arm 92 and thereby the sealing flap 50.

FIGS. 21 to 26 show a fourth embodiment of the oven 100 in which the door 16 is moved by the vent actuator 11 to vent the cooking cavity 12 in manner similar to the first embodiment 10. Once again, the oven 100 is shown without the external shell to reveal the cooking cavity 12 supported on a base 14. The cooking cavity 12 has a door 16 hinged to the front for user access to the cavity interior. The oven 100 has a means of generating heat 18 such as an electric heating element (not shown) to cook the food within. The cooking process is controlled by a control processor 15 in accordance with inputs from a user interface 17 and feedback sensors 19 (schematically depicted in FIG. 27).

The vent actuator 11 has a motor 20 positioned toward the front of the cooking cavity 12 to actuate a swing arm 94. The swing arm 94 is fixed to the motor 20 to sweep through a defined arc along the left sidewall 72 of the cavity 12. The upper portion of the swing arm 94 has a curved or bowed structure 96 that pushes on a sliding push rod or finger 102 against the bias of a return spring 98.

Figure 24:
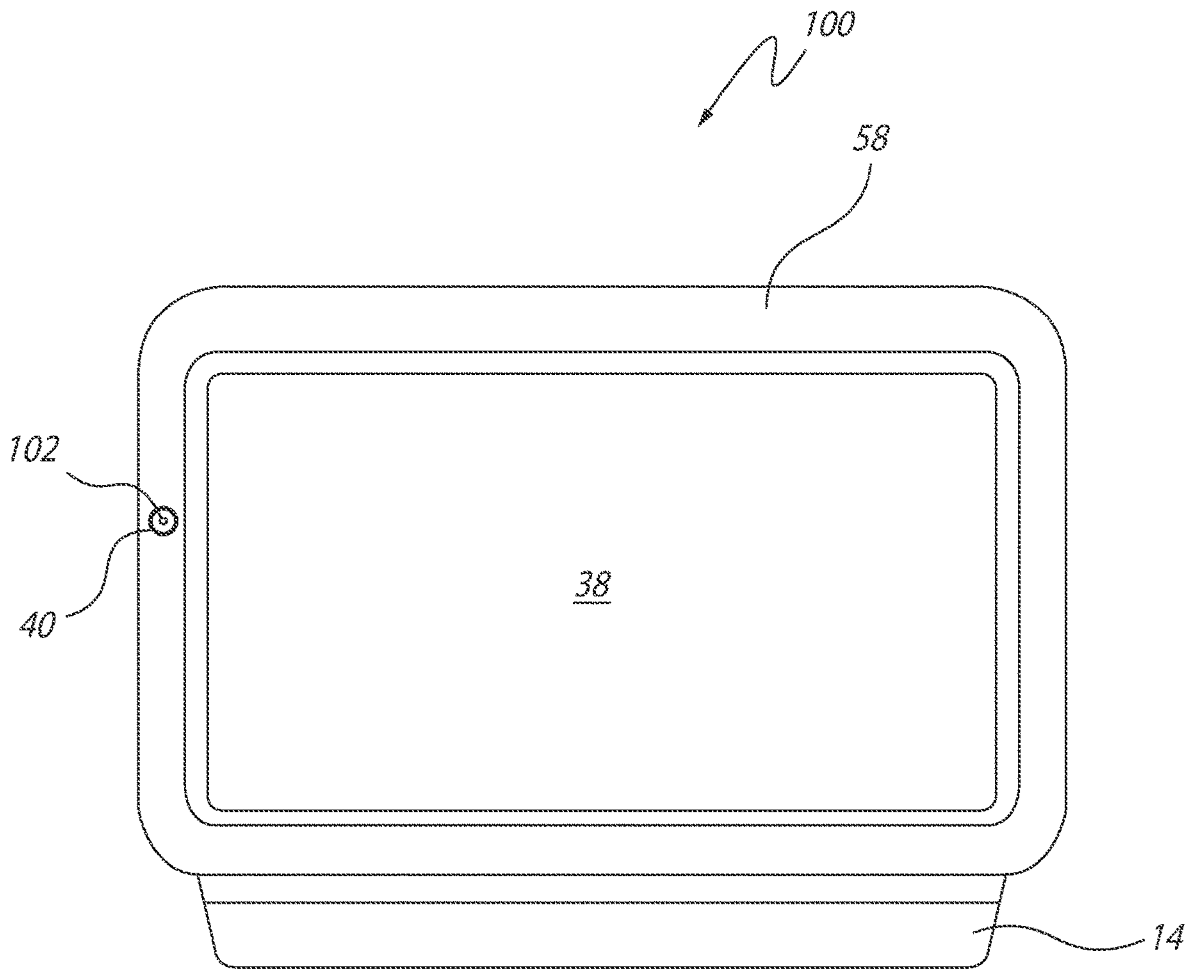
FIG. 24 is a front elevation of the fourth embodiment of the oven.
Figure 25:
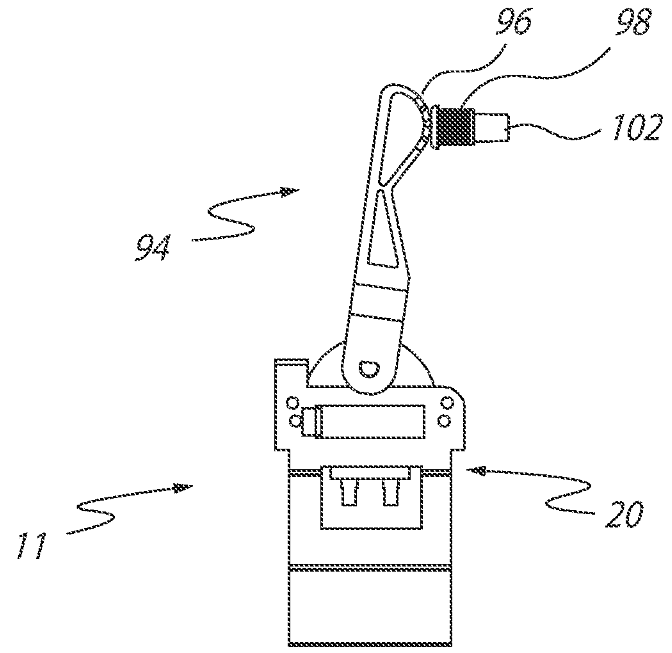
FIG. 25 is the actuating lever and spring-loaded pusher in the vent open position shown in isolation.
Figure 26:
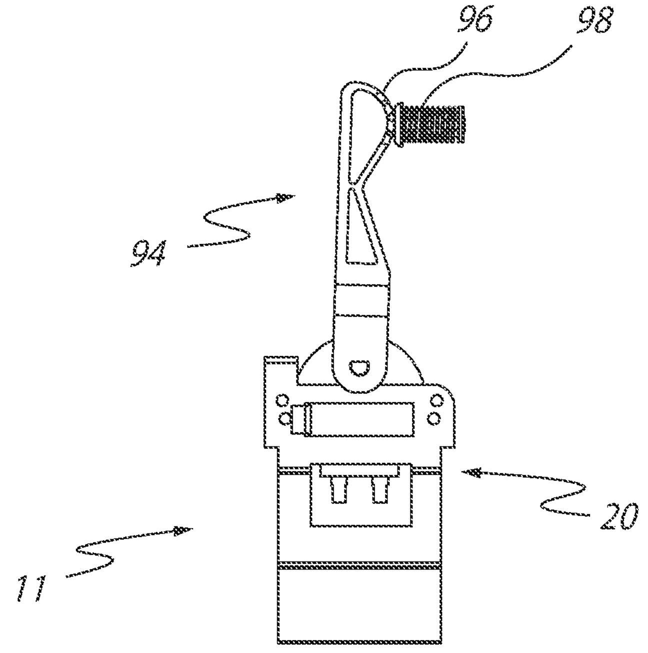
FIG. 26 is the actuating lever and spring-loaded pusher in the vent closed position.

The push rod 102 is mounted such that it can extend and retract through an aperture 40 in the peripheral flange 58 surrounding the front opening 38 of the cooking cavity 12 (as best shown in FIG. 24). However, the spring 98 is dimensioned to abut the rear surface of the flange 58 to limit the forward movement of the push rod 102 to the point where the spring is fully compressed. FIG. 25 shows the spring 98 fully compressed by the swing arm 94 while FIG. 26 shows the push rod 102 retracted back into the decompressed spring 98 as the swing arm 94 rotates rearwardly (i.e. anti-clockwise as viewed in FIGS. 25 and 26).

Figure 22:
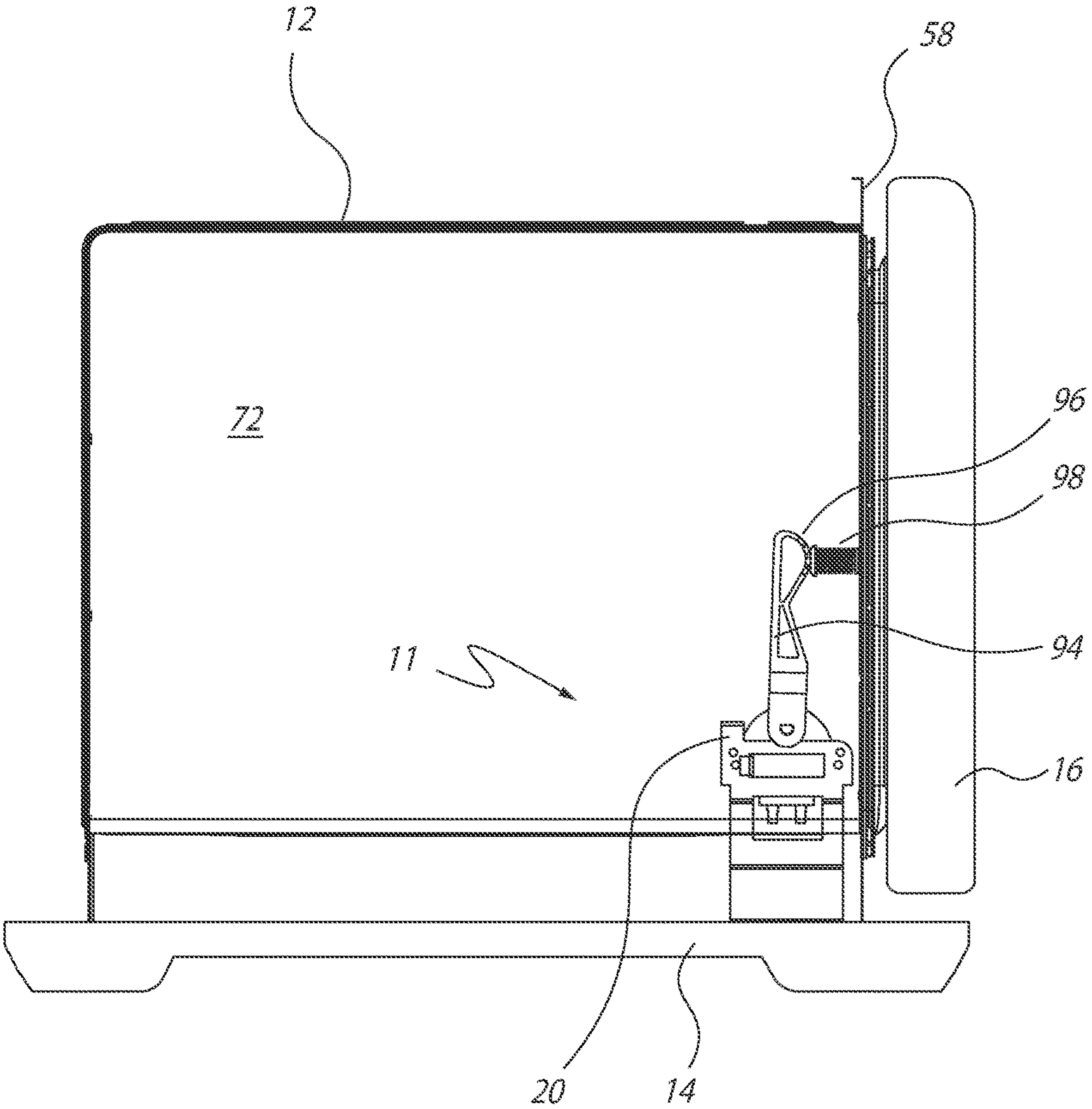
FIG. 22 is a left elevation of the fourth embodiment of the oven with the vent in the closed position.
Figure 23:
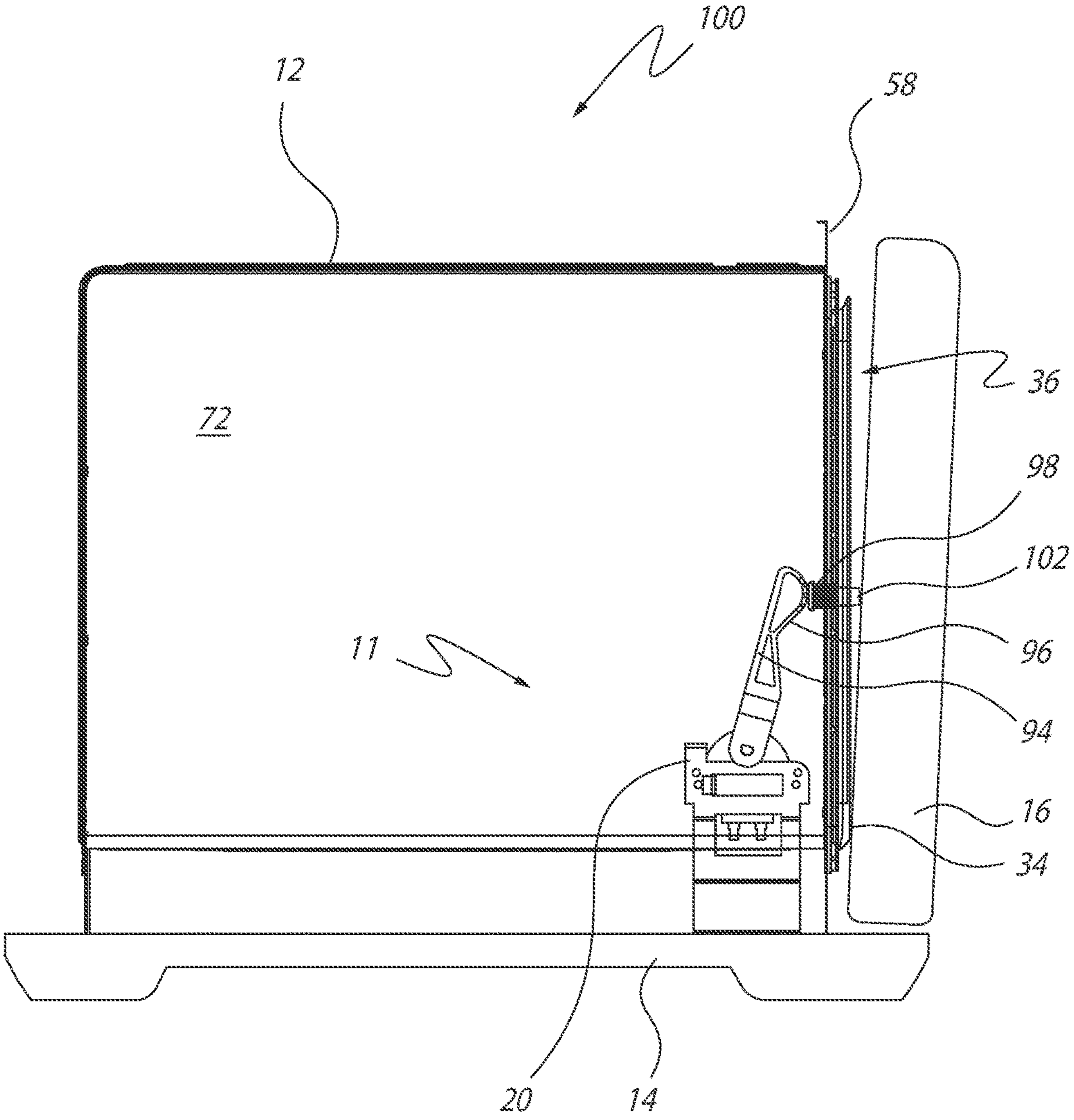
FIG. 23 is a left elevation of the fourth embodiment of the oven with the vent in the open position.

As best shown in FIGS. 22 and 23, the spring-loaded push rod 102 pushes on the rear surface of the door 16 in response to forward rotation of the swing arm 94. The door 16 opens to a predetermined angle about the hinge 34 to provide a vent opening 36 such that the interior of the cavity 12 can vent to atmosphere. If the user sees the door 16 ajar and pushes it shut, the bowed or curved end 96 provides a dampening mechanism by collapsing or deforming to avoid damage to the swing arm 94 or motor 20.

As with the previous embodiments, the vent opening 36 allows the processor 15 to control the humidity within the cooking cavity 12. During the designated cooking program (sometimes called the cooking profile), the cavity 12 is vented through a vent opening 36 of predetermined size, at pre-set time and for pre-set opening periods. Excess steam or humidity in the cooking cavity 12 is effectively released during the cooking process so the surface of the food reaches a higher temperature and crisps (if desired). Furthermore, the humidity release reduces the risk of a dangerous steam blast upon opening the oven door 16. Periodic venting allows improved results from cooking modes such as 'Air-fry' and 'Dehydrate' which requires the cooking cavity 12 to be opened multiple times during the cooking process.

In some cooking programs, the control processor 15 will completely close the vent opening 36 after the pre-set venting period. Optionally, the processor 15 will partially retract the push rod 102 for a smaller vent opening 36 to provide a constant steam release at a reduced vent rate while maintaining the required cooking temperature. The vent opening times, venting rates (i.e. vent opening 36 size), and the opening periods are dependent on one or more of the factors discussed above in relation to the first embodiment.

In Table 1 shown below, a range of different venting programs for associated different cooking functions is shown. The Air Fry mode of operation has the highest steam release rate in terms of vent open/vent close times because the need to crisp the food surface requires the least steam compared to the other cooking modes. Pizza mode requires a relatively higher steam release rate than Roast and Dehydrate (for example) in order to obtain a crispy crust.

TABLE 1

Example steam vent timing for different cooking programs

| Food type | Steam Release Avalibility | Preset cycle time | Steam Release Beginning time | Programmed Steam Release Period | Steam Release End time |
|---|---|---|---|---|---|
| Toast | No | X1 | — | — | — |
| Broil | No | X2 | — | — | — |
| Bake | No | X3 | — | — | — |
| Roast | Yes | X4 | ⅓ of a cooking cycle | Y4 (sec) open/Z4 (sec) close | End of cycle |
| Dehydrate | Yes | X5 | ⅙ of a cooking cycle | Y5 open/Z5 close | End of cycle |
| Pizza | Yes | X6 | after ½ of a cooking cycle | Y6 open/Z6 close | End of cycle |
| Airfry | Yes | X7 | ⅓ of a cooking cycle | Y7 open/Z7 close | End of cycle |
| Slow Cook | No | X8 | — | — | — |

Note:
air fry mode has the highest steam release rate (open time/close time) as the crispy results require the least steam comparing to other cooking modes. Pizza mode requires higher steam release rate than roast and dehydrate to obtain crispy crust.

Figure 29:
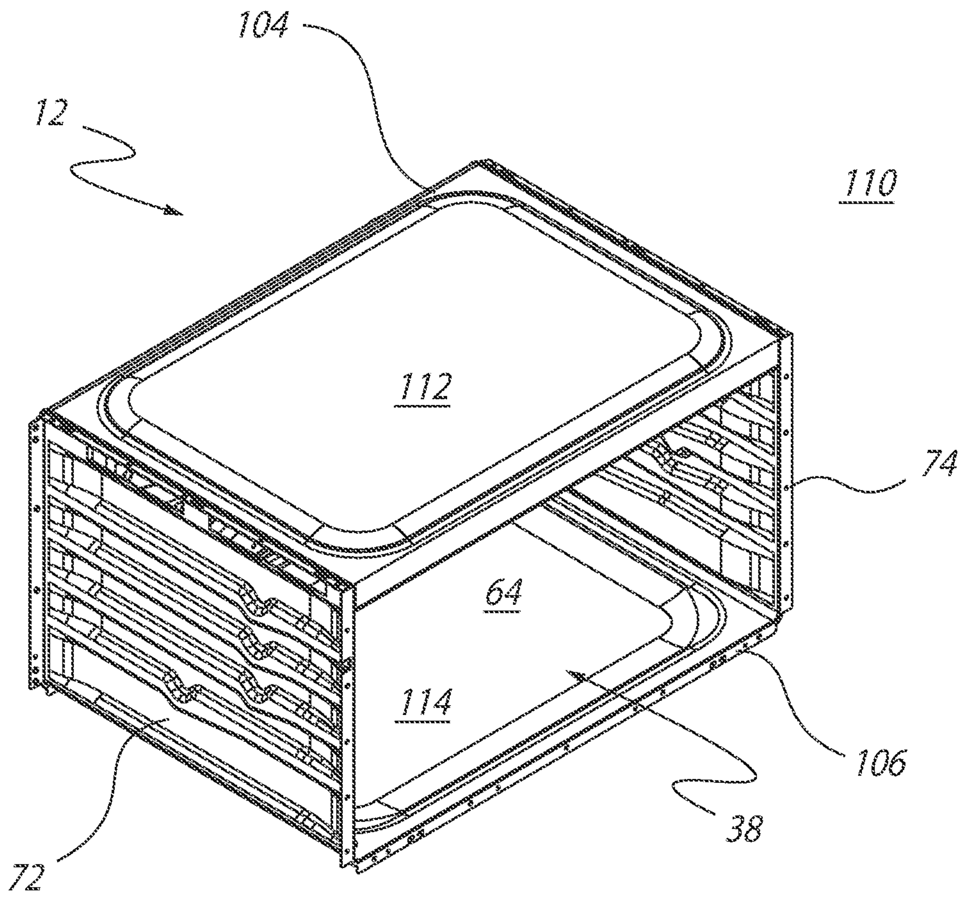
FIG. 29 shows the two major components of the oven cavity assembled together in a perspective view.
Figure 30:
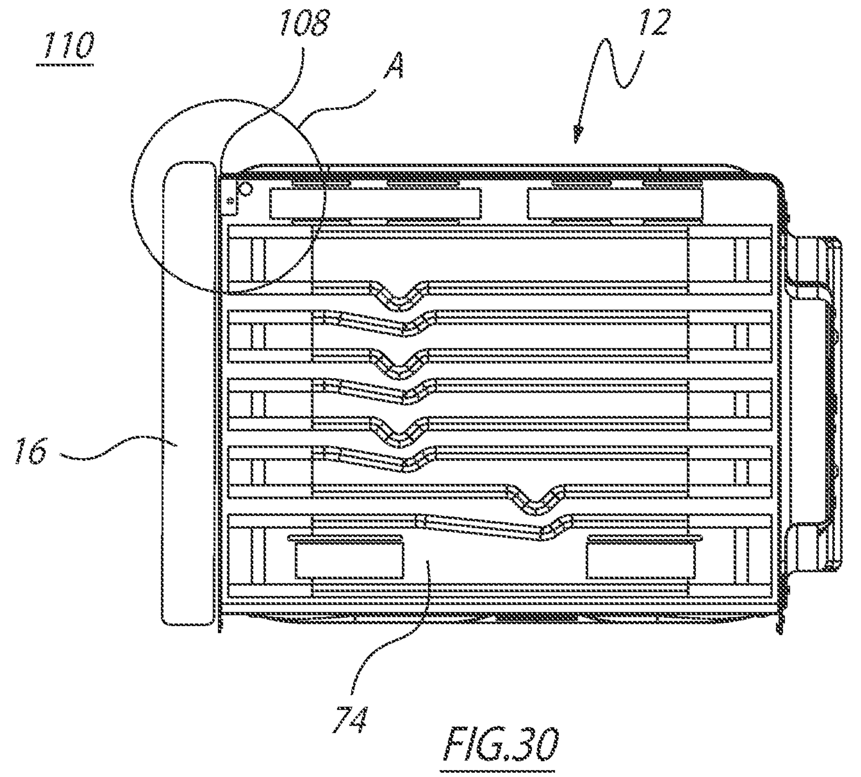
FIG. 30 is a left elevation of the oven cavity indicating the location of the pelmet-like structure.
Figure 31:
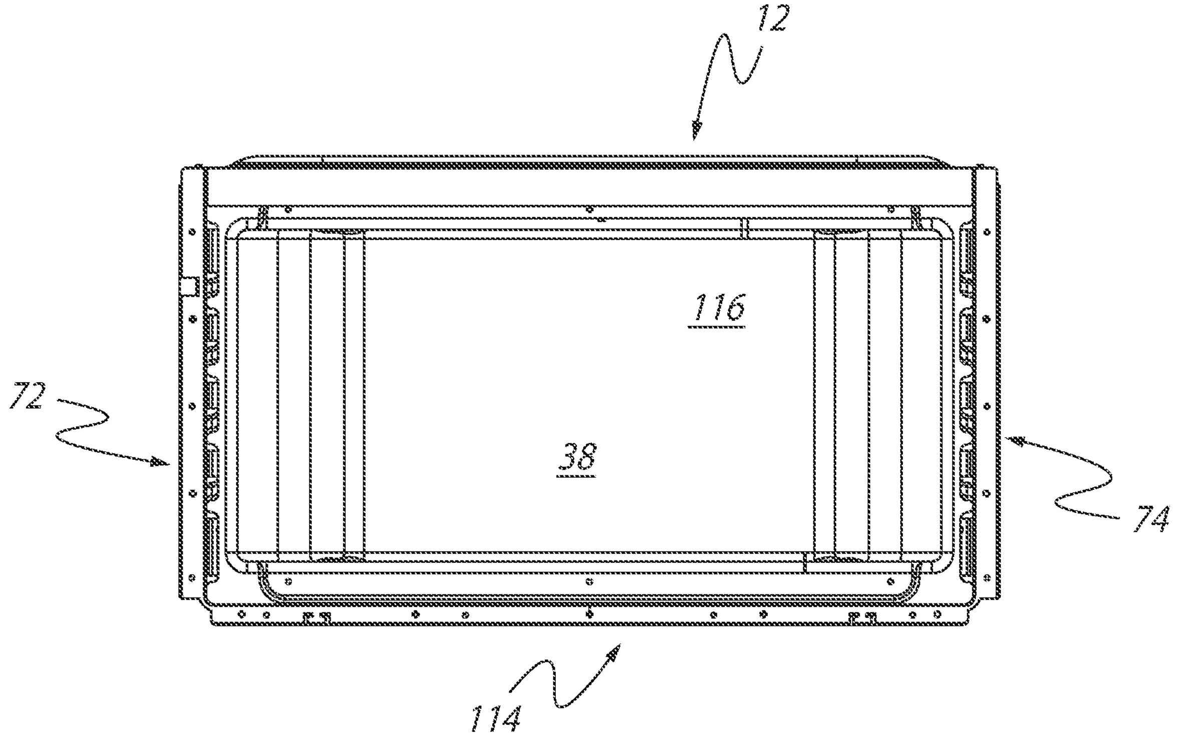
FIG. 31 is a front elevation of the assembled components of the oven cavity shown in FIGS. 28 and 29.
Figure 32:
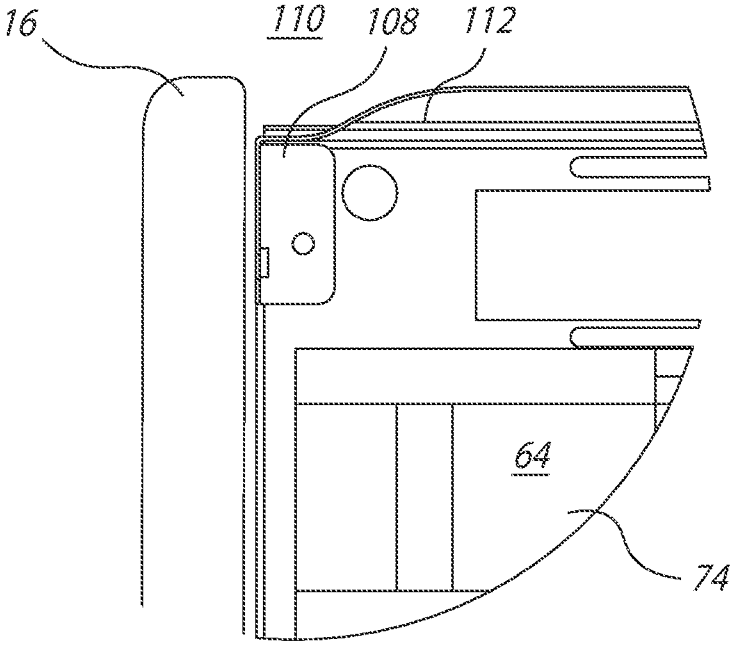
FIG. 32 is an enlargement of inset A shown on FIG. 30 with the door in the closed position.
Figure 33:
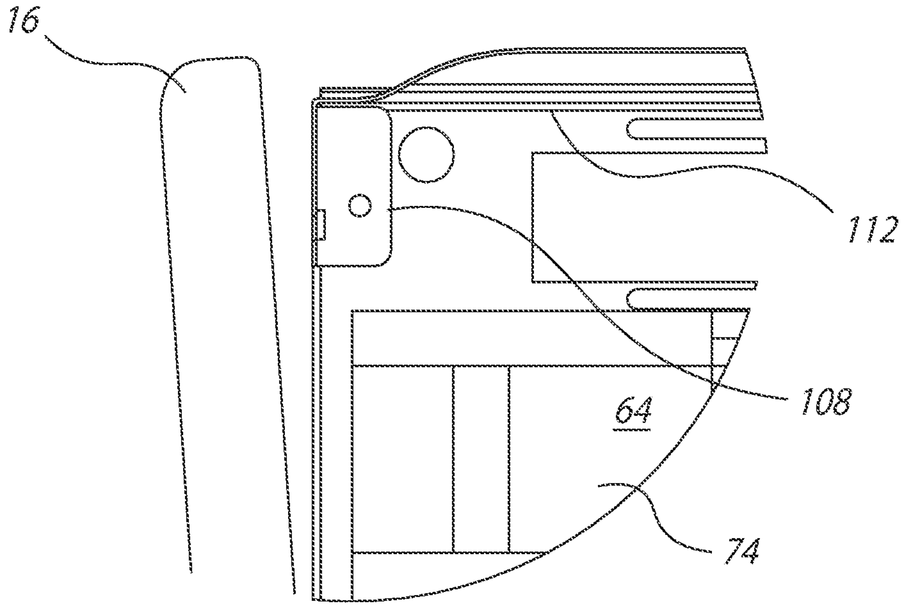
FIG. 33 is an enlargement of inset A shown on FIG. 30 with the door in the open position to vent the oven cavity; and, FIG. 34 is an enlargement of inset A shown on FIG. 30 showing the tortuous, partially obstructed fluid flow paths from the oven cavity when venting.
Figure 34:
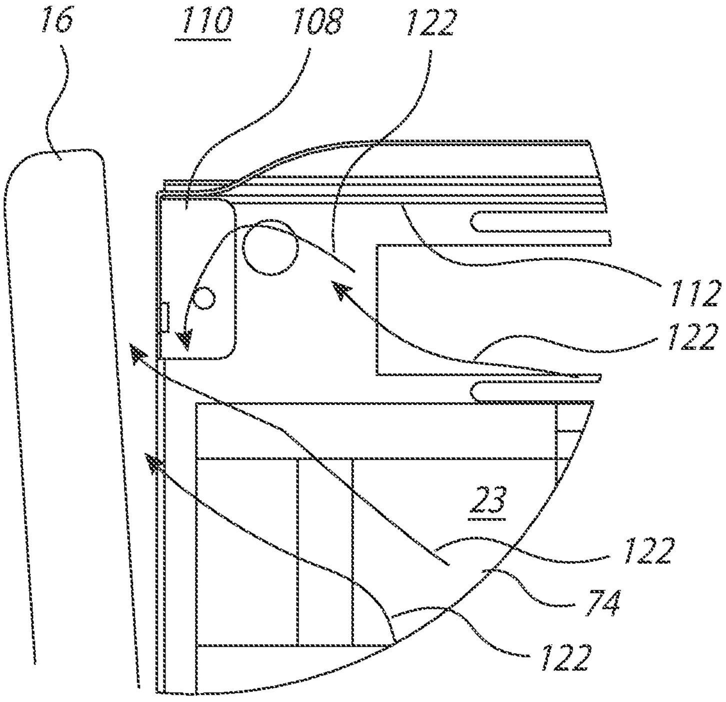

FIGS. 28 to 34 illustrates a construction of the cooking cavity 12 with advantages in terms of fire containment as well as production costs. The cooking cavity 12 is formed from two components: a first L-shaped component 104 and a second U-shaped component 106. As shown in FIG. 29, the L-shaped component 104 and the U-shaped component 106 joined together to define the interior space 64 with a door 16 closing the front opening 38. As shown in FIGS. 30 and 34, a pelmet structure 108 is provided in the interior space 64 along the top wall 112. This pelmet structure 108 provides torturous fluid flow paths 122 from the interior space 64 to an exterior side 110 of the front opening 38. This provides an obstruction to flames escaping from the cooking cavity 12 along the top edge of the front opening 38.

Another fire containment/prevention feature relates to the mechanical connection between the peripheral edge sections 118 and 120 of the U-shaped component 106 and the L-shaped component 104. The connection is preferably formed the fluid type such that it provides a sealed cavity construction that avoids the ingress of air and the egress of steam. With the ingress of air constricted, the oxygen needed to fuel a fire is restricted.

Constructing the cooking cavity 12 in this manner is cost efficient due to the low part numbers and only five straight line edges to be mechanically connected or welded together. The L-shaped component 104 has two generally planar panels 112 and 116 which provide the top wall and the rear wall respectively. Similarly, the U-shaped component 106 has three generally planar panels 32, 114 and 74 to provide the left wall, bottom wall and right-side wall respectively. Suitable techniques for mechanically connecting the peripheral edge sections 118 and 120 include crimping, spot welding or screwed connection.

The present invention has been described herein by way of example only. Skilled workers in this field will readily recognise may variations and modifications which do not depart from the spirit and scope of the broad inventive concept.

PARTS LIST

| | |
|---|---|
| 10 | first embodiment of oven |
| 11 | vent actuator |
| 12 | cooking cavity |
| 14 | oven base |
| 15 | control processor |
| 16 | door |
| 17 | user interface |

-continued

| | |
|---|---|
| 18 | heat generator |
| 19 | feedback sensors |
| 20 | rear motor |
| 22 | vertical shaft |
| 24 | circular linkage |
| 26 | horizontal shaft |
| 28 | push rod |
| 30 | spring |
| 32 | front end of horizontal Shaft |
| 34 | door hinge |
| 36 | vent opening |
| 38 | front opening of cavity |
| 40 | push rod aperture |
| 42 | stepped sleeve |
| 44 | exterior step |
| 46 | clockwise limit switch |
| 48 | anti-clockwise limit switch |
| 50 | sealing flap |
| 52 | open groove |
| 54 | flap bias spring |
| 56 | flap axle |
| 58 | front flange |
| 60 | flap sealing face |

-continued

| | |
|---|---|
| 62 | large rear vents |
| 64 | cavity interior |
| 66 | flap tilt lever |
| 68 | curved abutment surface |
| 70 | flap end plate/hinged edge plates |
| 72 | left sidewall |
| 74 | right sidewall |
| 76 | oven seal |
| 78 | shaft coupling cam |
| 80 | second embodiment of oven |
| 90 | third embodiment of oven |
| 92 | swing arm |
| 94 | swing arm (with deformable end) |
| 96 | deformable bowed or curved end |
| 98 | return spring |
| 100 | fourth embodiment of the oven |
| 102 | push rod |
| 104 | $1^{st}$/L-shaped component |
| 106 | $2^{nd}$/U-shaped component |
| 108 | pelmet structure |
| 110 | exterior side of front opening/atm |
| 112 | top portion/top wall |
| 114 | bottom wall |
| 116 | rear wall |
| 118 | peripheral edge section of U-shaped component |
| 120 | peripheral edge section of L-shaped component |
| 122 | air flows venting from oven cavity |

The invention claimed is:

1. An oven for cooking food, the oven comprising:

a cavity for receiving the food to be cooked;

a door that opens to allow food to be placed in the cavity, and closed to enclose an interior space defined by the cavity;

a vent actuator configured to selectively open and close a vent opening, such that a fluid path extends from the interior space to atmosphere when the vent opening is open; and a processor for operative control of the vent actuator to open or close the vent opening at a predetermined time during and/or after the cooking of the food, wherein the vent actuator is configured to move the door to provide the vent opening at a controlled rate, wherein the vent opening is formed in the cavity and the vent actuator includes a vent flap configured to selectively open and close the vent opening, wherein the vent flap is within the cavity and configured for movement in response to the processor, and wherein the vent actuator has a movable abutment surface that is external to the cavity and the vent flap is connected to a tilt lever that is external to the cavity.

2. The oven according to claim 1, wherein the vent actuator includes a push rod configured to extend to push the door open to a vent open position to provide the vent opening.

3. The oven according to claim 2, wherein the door has a closing bias when in the vent open position, and the push rod is configured to retract in response to the processor to allow the door to close.

4. The oven according to claim 3, wherein the push rod is configured to partially retract in response to the processor to allow the door to move to an intermediate position between the vent open position and closed position.

5. The oven according to claim 2, wherein the vent actuator includes a resilient element allowing the push rod to retract in response to an external force acting on the push rod when extended.

6. The oven according to claim 5, wherein the resilient element is a coil spring.

7. The oven according to claim 5, wherein the vent actuator includes a movable arm to extend the push rod, and the resilient element is a compressible portion of the arm.

8. The oven according to claim 1, wherein the vent flap is biased to close the vent opening.

9. The oven according to claim 1, wherein the vent actuator includes a motor and at least one limit switch for selectively opening the vent opening.

10. The oven according to claim 1, further comprising a user interface to receive inputs related to at least one of:

Food type;

Food weight;

Cooking process; and selected cooked food characteristics.

11. The oven according to claim 10, wherein the cooking process selection available via the user interface includes at least one of:

Toasting;

Broiling;

Baking;

Roasting;

Dehydrating;

Pizza;

Airfrying; and

Slow cooking.

12. The oven according to claim 1, configured to cook the food for a predetermined cooking time and the vent actuator configured to open the vent opening after the predetermined cooking time to release steam.

13. The oven according to claim 1, wherein the vent flap is elongated and extends through the cavity between a left sidewall and a right sidewall.

14. The oven according to claim 13, wherein the vent flap is rotatably mounted to the left and right sidewall respectively, via a left and right flap axle fixed to a left and right flap end plate respectively.

15. The oven according to claim 14, wherein the tilt lever is fixed to the left flap end plate such that forward movement of the abutment surface rotates the vent flap against the bias of a return spring connected to the left flap end plate.

* * * * *